(12) United States Patent
Chandran et al.

(10) Patent No.: US 12,529,660 B2
(45) Date of Patent: Jan. 20, 2026

(54) INTEGRATED QUALITY MONITORING VIEW FOR BATTERY MANUFACTURING PROCESS

(71) Applicant: Honeywell International Inc., Charlotte, NC (US)

(72) Inventors: Anjali Chandran, Cochin (IN); Hrishikesh Thakre, Nagpur (IN); Senthilkumar Jayaraman, Mettur (IN); Ajaykumar Bangur, Bangalore (IN); Ajay Krishna, Lucknow (IN); Bharath Kumar M G, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 262 days.

(21) Appl. No.: 18/144,657

(22) Filed: May 8, 2023

(65) Prior Publication Data

US 2024/0377336 A1 Nov. 14, 2024

(51) Int. Cl.
*G01N 21/89* (2006.01)
*G01N 35/00* (2006.01)

(52) U.S. Cl.
CPC ... *G01N 21/8914* (2013.01); *G01N 35/00613* (2013.01)

(58) Field of Classification Search
CPC ............ G01N 21/8914; G01N 21/89; G01N 21/8901; G01N 21/86; G01N 21/892; G01N 35/00613; G01N 2021/888; G01N 2201/1042; G05B 2219/45234; G05B 19/41875; Y02E 60/10; H01M 4/04
See application file for complete search history.

(56) References Cited

U.S. PATENT DOCUMENTS

| | | | |
|---|---|---|---|
| 3,681,595 | A | 8/1972 | Dahlin |
| 4,921,574 | A | 5/1990 | Hu |
| 4,943,721 | A | 7/1990 | Vidrine |
| 5,795,394 | A | 8/1998 | Belotserkovsky |
| 7,528,400 | B2 | 5/2009 | Duck |
| 8,021,517 | B2 | 9/2011 | Hughes |
| 8,596,861 | B2 | 12/2013 | Kane |
| 9,309,625 | B2 | 4/2016 | Backstrom |
| 10,041,673 | B2 | 8/2018 | Pathangay |

(Continued)

FOREIGN PATENT DOCUMENTS

| | | |
|---|---|---|
| CN | 112258459 A | 1/2021 |
| CN | 110544231 B | 5/2021 |

(Continued)

*Primary Examiner* — Sang H Nguyen
(74) *Attorney, Agent, or Firm* — Seager, Tufte & Wickhem, LLP

(57) ABSTRACT

Integrated quality monitoring techniques enable a plant operator to simultaneously view and analyze data that are derived from a plurality of sensors. An apparatus for and a method of inferring quality of a sheet roll consecutively monitors new data including: (a) surface defects of the sheet roll from vision defect tracking system, (b) measurement defects of the sheet roll from vision measurement system, and (c) quality and defect data of the sheet roll from quality control system, and simultaneously integrating the new data with old data in history. Data connect application programming interface can furnish historical, current and alarms data for analysis to an aggregator node for reporting and analysis.

7 Claims, 20 Drawing Sheets

(56) References Cited

U.S. PATENT DOCUMENTS

| | | |
|---|---|---|
| 10,501,274 B2 | 12/2019 | Ramakrishnan |
| 10,628,934 B2 | 4/2020 | Weaver |
| 11,143,495 B2 | 10/2021 | Hughes et al. |
| 2009/0079971 A1* | 3/2009 | Toma .................... G01N 21/89 356/237.2 |
| 2009/0191327 A1 | 7/2009 | Lotz |
| 2012/0218542 A1* | 8/2012 | Ichizawa ............ G01N 21/3554 356/51 |
| 2013/0004816 A1 | 1/2013 | Berkowitz |
| 2018/0172432 A1 | 6/2018 | Hughes |
| 2018/0211373 A1* | 7/2018 | Stoppa ..................... G06T 7/55 |
| 2018/0356805 A1 | 12/2018 | Krishna |
| 2019/0178812 A1* | 6/2019 | Richard ............ G01N 21/8806 |
| 2020/0096380 A1 | 3/2020 | Nebel |
| 2021/0223171 A1* | 7/2021 | Shitara ................ G01N 33/346 |
| 2021/0232985 A1* | 7/2021 | Palanisamy ........ B65H 23/0258 |
| 2021/0262776 A1 | 8/2021 | Tixier |
| 2022/0305516 A1 | 9/2022 | Lee |
| 2023/0021315 A1* | 1/2023 | Martins Loureiro .. D04B 35/20 |

FOREIGN PATENT DOCUMENTS

| | | |
|---|---|---|
| CN | 111951253 B | 8/2021 |
| CN | 114308723 A | 4/2022 |

\* cited by examiner

INTEGRATED QUALITY MONITORING VIEW FOR BATTERY MANUFACTURING PROCESS

FIELD OF THE INVENTION

The present invention generally relates to quality control of continuous sheet materials and, more particularly, to employing a plurality of sensors to obtain defect measurements to monitor sheet materials, such as electrodes that are used in lithium-ion batteries, and displaying the results in an integrated, easy-to-visualize fashion. A high-performance defect map that combines various measurement data enables operators to view the defect map in one screen.

BACKGROUND OF THE INVENTION

On-line measurements are used to detect properties of sheet materials during manufacture to enable prompt control of the sheetmaking processes and, thus, to assure sheet quality while reducing the quantity of substandard sheet material which is produced. For instance, in the fabrication of electrodes for lithium-ion batteries, metal foil from metal rolls is continuously coated with a mixture of active material. Slitting machines cut the finished coated metal foils into sheets of electrodes that are assembled into the cells and batteries. To achieve and maintain the quality of continuous, roll-to-roll production of electrodes, there must be constant, online measurements of quality factors that are strongly linked to battery performance. Faulty batteries are produced if upstream defects are not detected and corrected or removed. There are multiple discrete defect monitoring systems used in lithium-ion battery production including, for instance, visual systems (cameras) and quality control system (QCS) scanning systems.

One of the main complications in making on-line measurements during sheetmaking is that the physical properties of sheet materials usually vary in the machine direction (MD) as well as in the cross direction (CD). "Machine direction" refers to the direction of travel of the sheet material during manufacture, and the term "cross direction" refers to the direction across the surface of a sheet perpendicular to the MD.

To detect variations in sheet materials, scanning sensors are employed that periodically traverse back and forth across a sheetmaking machine in the CD while detecting values of a selected sheet property such as basis weight or caliper along each scan. Normally, the sheet being produced is traversed from edge to edge during each scan.

In practice, measurement information provided by scanning sensors is usually assembled after each scan to provide a profile of the detected sheet property in the CD. In other words, each profile is comprised of a succession of sheet measurements at adjacent locations in the cross direction. The purpose of the profiles is to allow cross-directional variations in sheet properties to be detected easily Based upon the detected cross-directional variations in the detected sheet property, appropriate control adjustments can be made to the sheetmaking machine with the goal of reducing profiles variations both in the CD and in the MD.

A scanning sensor that periodically traverses a sheet at generally constant speed cannot measure the selected sheet property at locations which are aligned exactly perpendicular to the longitudinal edges of the sheet. Because of the sheet velocity, scanning sensors actually travel diagonally across the sheet surface, with the result that consecutive scanning paths have a zig-zag pattern with respect to the direction perpendicular to the longitudinal edges of sheet. As is apparent, scanning sensors only measure a small portion of the sheet which is along the diagonal zig-zag pattern. In practice, it is typical to calculate an average of profile measurements over each scan. Such averages are often called "last" averages because they are calculated after each scan is completed.

Most manufacturing plants use monitors that display real time measurement data in the form of color maps to show variations detected on the sheet. As shown in FIG. 17, the MD data from a sensor is shown in the six vertical columns. The columns show the different strips on a coating. For instance, for a six-strip coating section, the visualization also shows six strips. All columns hence are captured at the same time. The left column represents recent data and the last column on the right represents earlier data. The top of the left column is real time current data. The color legend on the left side is a scale that correlates specific hues (not shown) to particular measurement quantities. For each of the six columns or maps, the width of the column corresponds to the CD of the sheet being monitored. The maps monitor patterns of data change which can indicate some underlying defects. Different values are given specific colors and plotted on the map. As the values change, the operator can observe the corresponding colors changing and the operator can infer a variation from threshold by observing this.

Color maps are difficult to read as the operator needs to keep in mind what each color and pattern change means. The operator can only assume the change in pattern is a defect, although there may not be a definitive indication that there is a defect. With lithium-ion batteries, there are various types of defects that can impact the surface such as decarburisation, bubbling, air bubbling, holes, craters, and dark points. With color mapping, it is impossible to identify which types of defects are detected.

In addition, with a scanning sensor which moves across the sheet width to capture deviations along a zig-zag pattern, the scan path will be a diagonal line across the sheet. The position is represented as a single CD location on the color map. The diagonal line is represented by a single horizontal line on the color column or map. This distorts the operator's view and also does not show defects that fall on areas that are not in the scan path.

Plants also display measurement data in profile view to monitor variations and defects on the sheet. An upper plot in FIG. 18 displays (measured) basis weight (g/m$^2$) vs. bin for a sheet. Crossing either of the two (dashed) threshold lines means that there is a defect in that area of the sheet with respect to the basis weight. A bottom plot in FIG. 18 displays scanner velocity (mm/sec.) vs. bin. An operator can monitor views of profile of basis weight vs. bin for a breach of threshold lines.

With current manufacturing techniques, both scanning and stationary monitoring systems are positioned at different strategic locations along the MD. Some monitor systems located early in the process while others are located farther downstream. In this fashion, different upstream stages of the manufacturing process are monitored and the data are available to a plant operator. Thus, any particular point (or section) along the MD of a sheet of processed material, for instance, can be subject to different protocols but at different times. However, defect detection and monitoring systems are standalone which makes it difficult for the plant operators and engineers to monitor and analyze data from the various systems. In particular, the operator/engineer must manually correlate multiple systems analyses of the same section of the sheet of material in order to make critical quality manufacturing decisions. Constrained by these not-so-user-friendly systems, the operator cannot make effective analyses and decisions in real time. The result is the production of a higher percentage of defective batteries which must be scrapped.

SUMMARY OF THE INVENTION

The present invention is directed to integrated quality monitoring techniques that enable a plant operator to simultaneously view and analyze data that are derived from a plurality of sensors. In the case of lithium-ion battery production, the operator can view upstream quality issues such as defects from the anode section or cathode section that are in the calendering section. Operators can make effective analysis of the sheet coating from multiple sensors and camera systems in real time. In the event that defects in the continuous sheet of material are detected and the locations and sources of the defects are then identified, the operator can quickly initiate appropriate corrective measures to resolve the problem.

Various embodiments of the present invention comprise apparatus for and methods of inferring quality of a sheet roll comprising consecutively monitoring new data comprising: surface defects of the sheet roll from vision defect tracking system, measurement defects of the sheet roll from vision measurement system, and quality and defect data of the sheet roll from quality control system, and simultaneously integrating the new data with old data in history.

In one aspect, the invention is directed to a method of monitoring the formation of a continuous sheet of material, that moves in a machine direction (MD), which includes: (a) measuring sheet characteristics of the continuous sheet of material; and (b) displaying sheet information corresponding to measured sheet characteristics on a display device, wherein the sheet information comprises an image that represents the continuous sheet of material and which identifies MD locations of selected sheet measured characteristics.

In another aspect, the invention is directed to a system for monitoring the production of a continuous sheet which travels in the machine direction (MD) that includes: a computer device that is configured to receive sheet information signals from a plurality of sensors that measure one or more characteristics of the sheet; a display device that is configured to generate integrated images in a display screen which respond to sheet information from two or more of the plurality of sensors.

The integrated quality measurement views of the present invention are exemplified by: monitoring views, analysis views and reporting views. The monitoring views can be used to see combined view of all defects aggregated from different systems mentioned above or can also be used to see disintegrated views of each system individually. They can also be used to flag areas manually by operators, if the operator wishes to override or complement the auto flagging by algorithm. The analysis views can be used to drill down into the data and analyze defect patterns, count of defects based on types, instance of defect occurrence, trend analysis and perform several other quantitative and qualitative analysis. The operator can either choose an aggregated view for analysis or disintegrated view of the defect data for analysis. The reporting views are used for reporting defect information in various details that can be chosen using different filters supported in the system. User can view report from each of the systems individually.

Integrated quality monitoring enables plant operators to view (1) defects by categories, severity, and density from QCS and vision systems, (2) the exact size and position of defects, and (3) real time locations of the defects. Cyclic defect indication identifies any deviation in the machine parameters. The operator can flag areas that need to be analyzed later while the system can automatically flag areas that are having issues which require immediate attention. The operator can apply a flag filter to view all areas that have been automatically flag by the system. This feature helps in future analysis to identify defected areas quickly. Moreover, based on manual flagging patterns, the system can start predicting possible critical areas.

The system employs multiple cameras and scanners; this allow correlation between defects from various processes. For example, a hole defect originating from the coating process can be seen as having closed up after the drying process. The life of a defect can be monitored easily using a flexible multiselect view. The operator can also select views by process (drying, coating, etc.) or asset (camera 1, scanner 1, etc.). By comparing the defect map with color map, the operator can see how specific deviations have been building before the actual defects materialize.

While the invention will be illustrated as being implemented in lithium-ion battery production, it is understood that the invention is applicable in other continuous sheet making processes such as, for example, in the manufacture of paper, rubber sheets, plastic film, metal foil, and the like.

DETAILED DESCRIPTION OF THE PREFERRED EMBODIMENTS

Figure 1A:
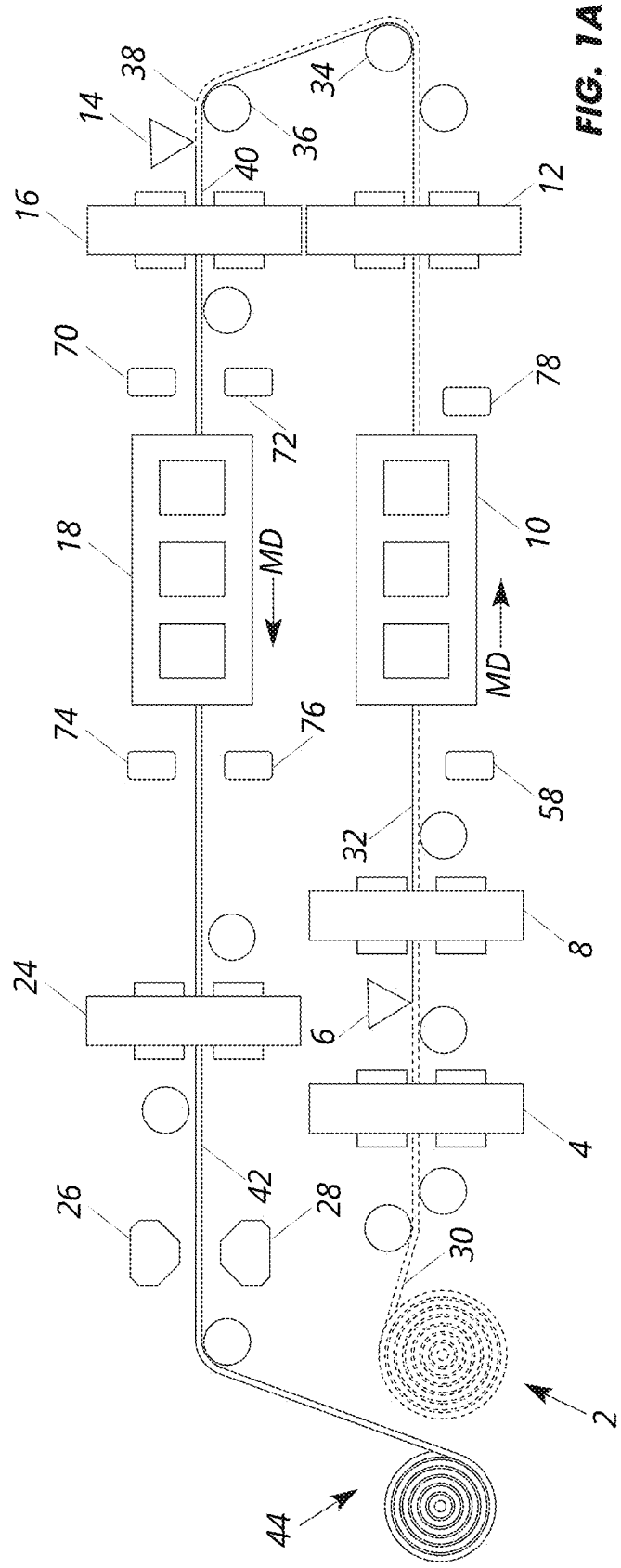
FIG. 1A depicts a roll-to-roll sheet production system for continuous coating of a metal substrate with anodic or cathodic materials.

FIG. 1A illustrates a process for coating a metal web or sheet that is used in fabricating electrodes for lithium-ion electrochemical cells and batteries. For making anodes, the electrode coating includes anodic active materials such as graphite and, for making cathodes, the electrode coating includes cathodic active materials such as a lithium metal oxide. Electrodes include a current collector metal foil that is coated on both sides of the foil with electrode slurry which can also include carbon black, binder, and solvent. After the electrode slurry is applied on a side of foil, the wet coated foil is heated in a dryer to extract the solvent to leave a solid layer of electrode material which adheres to the metal foil. Copper foil is a preferred anode current collector material and aluminum foil is a preferred cathode current collector material.

As shown in FIG. 1A, a roll 2 is unwound by an unwinder and supplies a continuous metal web or sheet 30 that is coated on a top surface with a layer of electrode slurry by a coater 6. The basis weight, thickness, and other characteristics of the metal web or sheet 30 from roll 2 are usually known; scanning beta gauges 4 and 8 are employed to measure, respectively, the basis weight and/or thickness before, and after, the electrode slurry is applied by the coater 6.

The coater 6, such as a tape casting coater, includes actuators that control a slot die/doctor blade to regulate the amount of slurry that is extruded onto the sheet 30. A dryer 10 removes excess solvents and cures the slurry that is on a moving coated sheet 32 to form an electrode layer on the sheet. Imaging devices 58 and 78 capture surface images of the coated sheet 32 before and after the dryer 10. Each imaging device typically includes a camera and a light source that illuminates the surface of the coated sheet 32. The imaging device may be stationary or scanning. For a stationary device, the camera takes digital images of the surface of the coated sheet 32 across an entire width. The camera generates a series of images that may be superimposed to form a continuous image of the entire coated sheet 32.

A scanning beta gauge 12 measures the basis weight and/or thickness of the moving coated sheet 32 exiting the dryer 10 after the calender 54. Thereafter, rolling supports 34, 36 reverse the orientation of a moving sheet 38 so that the uncoated side is on top whereupon a coater 14 applies a layer of electrode slurry on the top uncoated surface of a moving sheet 38. The basis weight and/or thickness of a double-side coated sheet 40 are then measured with a scanning beta gauge 16 before entering a dryer 18. Imaging devices 70 and 72 capture top and bottom surface images of the sheet before the dryer 18 while imaging devices 74 and 76 capture top and bottom surface images of the sheet after exiting the dryer 18.

Further downstream, a beta gauge that is housed together with an infrared temperature sensor in a scanning device 24 measures the basis weight and/or thickness and the temperature of the double-coated sheet 42 as the scanning device 24 moves back and forth across the double-coated sheet 42. A rewinder takes up the double-side coated sheet 42 into roll 44. Surface defects on the top and bottom coatings are monitored by imaging devices 26, 28.

Figure 1B:
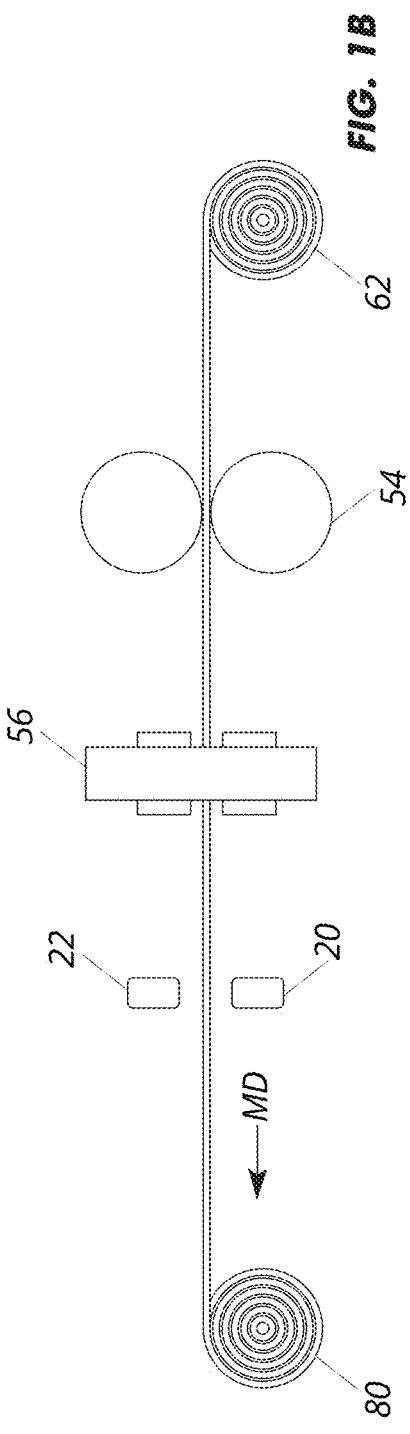
FIG. 1B depicts the calendaring process.

FIG. 1B, shows the calendering process whereby the double-coated electrode layer from roll 62 passes through a calender 54 which finishes and smooths the electrode layer. The basis weight and/or thickness of a double-side coated sheet are then measured with a scanning beta gauge 56 and imaging devices 22 and 20 captures the top and bottom surface images before being collected in roll 80. The scanners and cameras are part of the quality control system (QCS).

For monitoring the double-side coated sheet 42 with the present invention, thermographic image data of the coated sheet 42 is correlated and corrected with the online basis weight and/or thickness measurements of the coated sheet 42 to generate more accurate basis weight and/or thickness calculations across the coated current collector along its entire cross direction (CD).

Figure 2A:
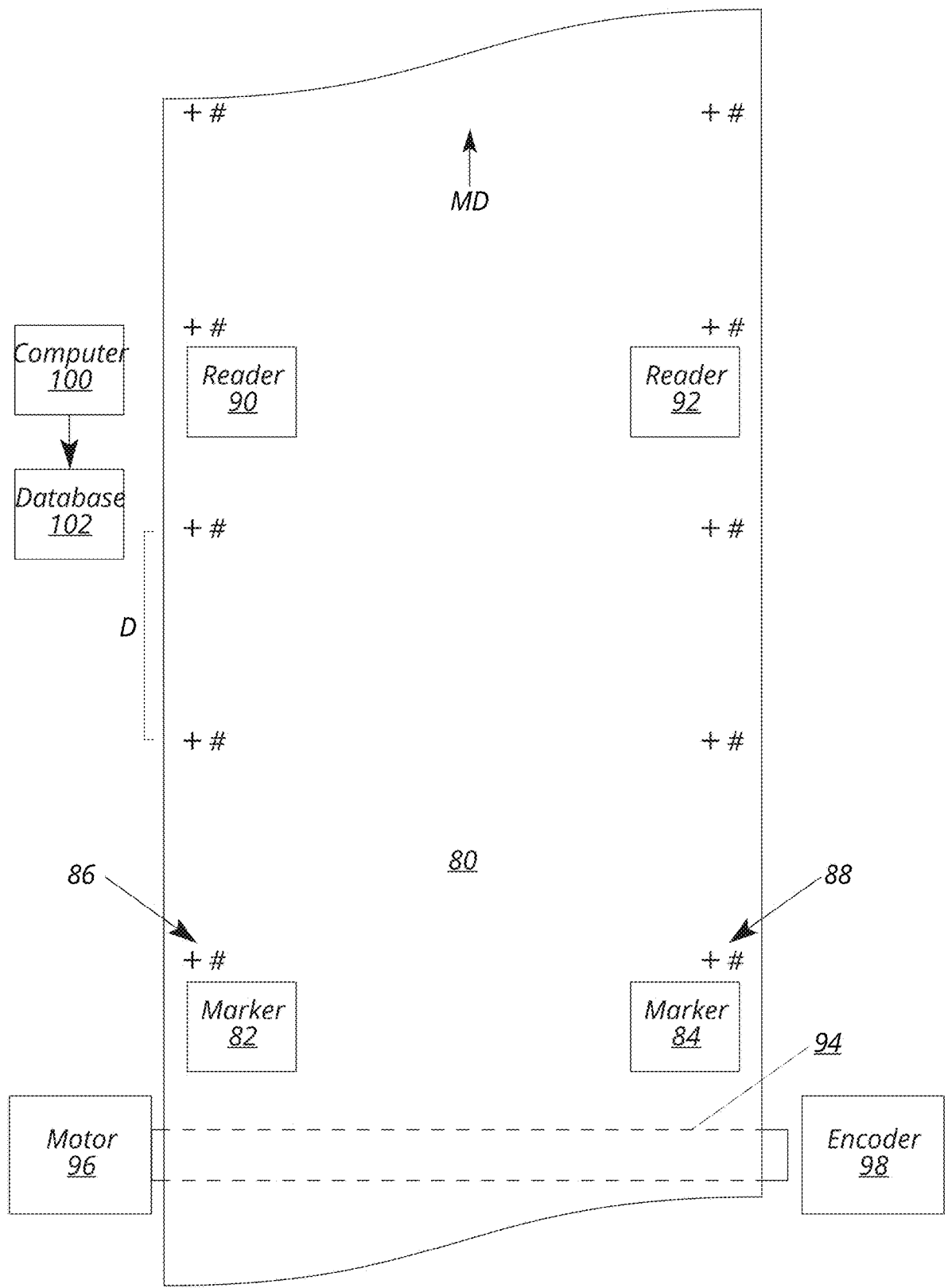
FIG. 2A is a plan view depicting a system for applying fiducial markings on a continuous moving sheet.

During production as shown in FIGS. 1A and 1B, the continuous sheet 30 can be marked to identify its position along the MD. For instance, reference marks or markings and associated tracing codes (collectively referred to as "fiducial markers") serve as reference points along the MD. FIG. 2A shows a system for applying a series of fiducial markers that include reference marks or markings and associated tracing codes onto a moving sheet of material 80. Stationary marker device 82 is positioned over the sheet to apply a series of fiducial markers 86 along one edge of the moving sheet while stationary marker device 84 is positioned over the sheet to apply another series of fiducial markers 88 along an opposite edge of the moving sheet. Each series of fiducial markers is aligned along the MD In the event the sheet is slit along the MD, each series of fiducial markers may be employed separately. The reference mark or marking is configured as a horizontal line that is perpendicular to the MD and a vertical line that is parallel to the MD. A preferred configuration of the reference mark is a cross-shaped or plus "+" sign. Successive horizontal elements or components of the reference marks may be separated by a distance D. The vertical elements or components of the reference mark may be formed a specific known distance from the adjacent sheet edge. The tracing code uniquely identifies each associated reference mark 82, 84. The sheet 80 is supported and transported by a roller 94 whose speed is monitored by an encoder 98. The marker devices may be any suitable device that generates sufficiently permanent marks on the metal substrate and/or coating. For example, a laser may be used to mark metal while an inkjet printer may be used to mark paper, plastic, and fabric.

In operation, a computer 100 regulates a motor 96 to control the MD speed. A computer that includes a processor and storage (memory) such as a laptop computer may be used. The markers 82 and 84 each periodically mark an uncoated, or coated, area of the sheet with the fiducial markers which are tracked to a time or a roll encoder measurement generated by encoder 98. The code from the encoder 98 may be, for example, an encoder count, millisecond time, or a number, or computer readable code, which is associated with such quantities. The code is stored in a database 102. The codes are unique so they cannot be duplicated. As further described herein, readers 90, 92, such as optical character recognition detectors, scan the fiducial markers 82, 84. It is understood that the fiducial markers 82, 84 may be applied to any part of the moving sheet 80 including the uncoated and/or coated areas.

Figure 2B:
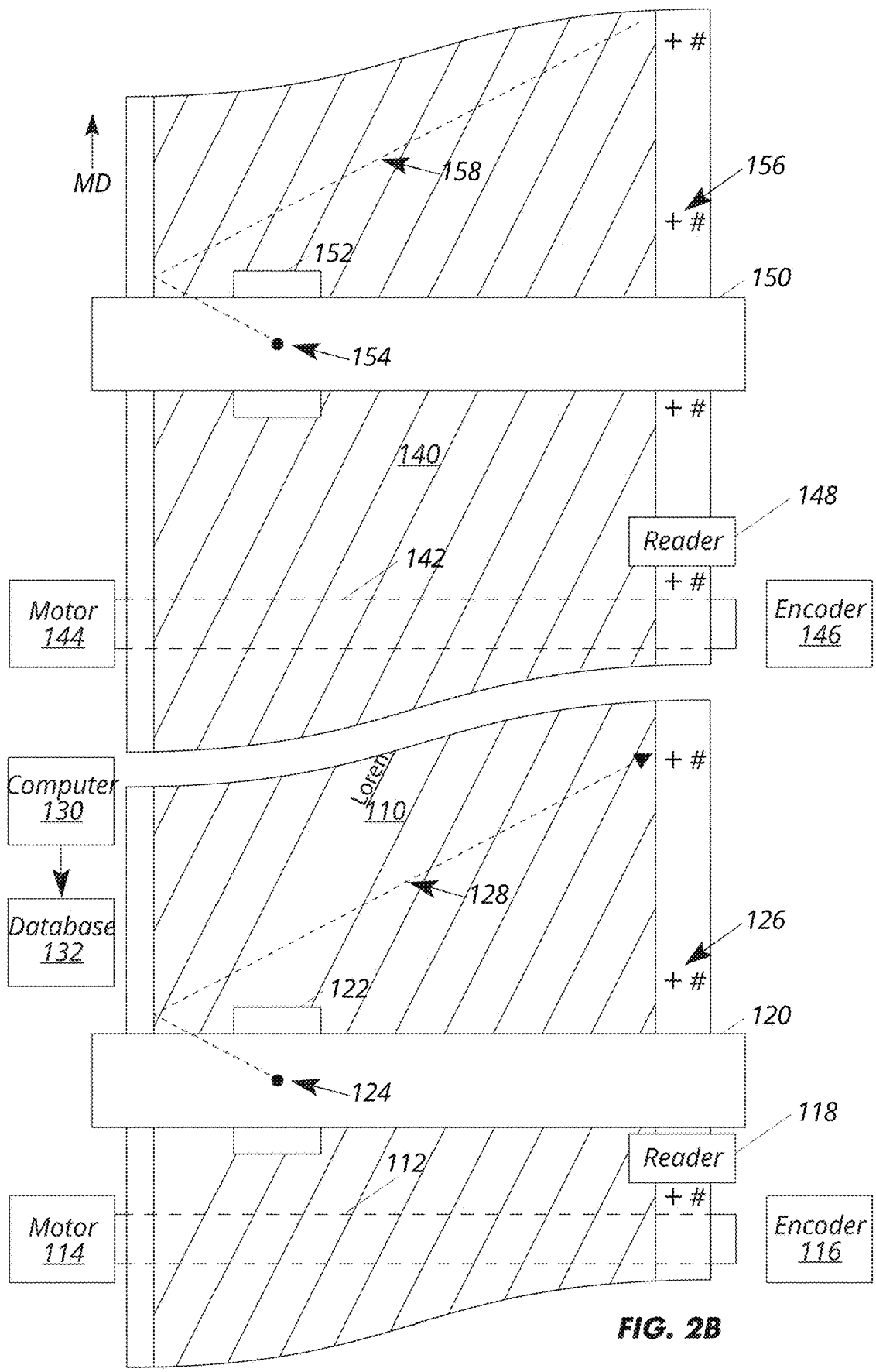
FIG. 2B is a plan view illustrating electrode fabrication employing fiducial markers to establish traceability of measurements by reading the fiducial markers on a continuous moving sheet and coordinating measurements using the marks.

FIG. 2B illustrates the use of the fiducial markers 82, 84 in tracking different measurements of electrode layer(s) on a moving sheet. Electrode layer 110 is coated on a moving metal substrate that is supported and transported in the MD by roller 112 which is operated by motor 114. Encoder 116 monitors the speed of roller 112. Reader 118 recognizes fiducial marker characters 126 on the uncoated side of the moving sheet. Frame 120 supports scanning device 122 that includes a gauge which measures the basis weight and/or thickness of the coated sheet. The scanning device periodically traverses coated sheet 110 generally at a constant speed. The gauge is shown measuring a spot or area 124 of the coated sheet 110. Because of the sheet velocity, the scanning device travels diagonally across the coated sheet surface, with the result that consecutive scanning paths have a zig-zag pattern with respect to a direction perpendicular to the longitudinal edges of coated sheet 110. An example of such a zig-zag pattern is scanning path 128 which would be traced by the gauge as the scanning device 122 traverses the surface of sheet during back-and-forth consecutive scans. The angles of the scanning path relative to the true CD depend upon the cross-directional (CD) velocity of the scanning device and upon the machine-directional (MD) velocity of the coated sheet 110 which is known. The zig-zag pattern of interrogation spots covers a relatively small portion of the coated sheet 110 surface.

Computer 130 coordinates the measurements by scanning device 122 so that the locations of interrogation spots in pattern 128 are recorded in database 132 along with the corresponding fiducial markers. In this fashion, the measurements made on each electrode are known.

Another feature is that the fiducial markers may be employed to synchronize subsequent measurements to prior measurements. For example, coated sheet 110 of FIG. 2B after being measured by sensor 122 can be removed to another line for further processing such as for drying or calendering. Thereafter, the so-treated coated sheet 140 is formed and is subject to a second measurement. Sheet movement is supported on a roller 142 and a frame 150 secures a second scanner device 152. Computer 130 controls motor 144, encoder 146 and scanner device 152 so as to synchronize second measurements by scanner device 152 with the first measurements executed downstream by scanner device 122. Reader 148 detects the fiducial marker 156 and scanning device 152 can be reset to commence measurements at interrogation spot 154 so that the interrogation spots in pattern 158 coincide with those in zig-zag pattern 128.

If scanners 122 and 152 are well-aligned such that the coated sheet edges are measured are at the same scanner bins on both scanners, when scanner 122 was at a first scanner position along the CD and detects a specific fiducial marker, then when scanner 152 detects the same specific fiducial marker, the scanner 152 should also be at the same first scanner position along the CD. However, in practice, even if scanners are well aligned, the moving coated sheet can wander from side-to-side in the CD and therefore it is necessary to adjust operations to account for this motion by using edge detection. The edge of the moving sheet can be designated as being detected at a specific fiducial marker xxx+number of encoder counts. In particular, the computer will receive a signal when one of the fiducial markers is read. However, these can be far apart so in order to monitor the sheet between successive fiducial markers, encoder signals can be used. In particular, the encoder sends pulses at much higher rates so computer can interpolate positions between fiducial markers using the pulses. The same would apply to the next scanner in the process.

As the second measurements by scanning device 152 are made, the locations of the interrogation spots in pattern 158 are recorded in database 132 along with the corresponding fiducial markers. The database thus has a library of first and second measurements that were made on essentially the same interrogation spots.

The present invention enables real time monitoring of the sheet production process. The display may be run on a PC, laptop computer, tablet computer, smartphone, or other portable or mobile or handheld device.

Figure 2C:
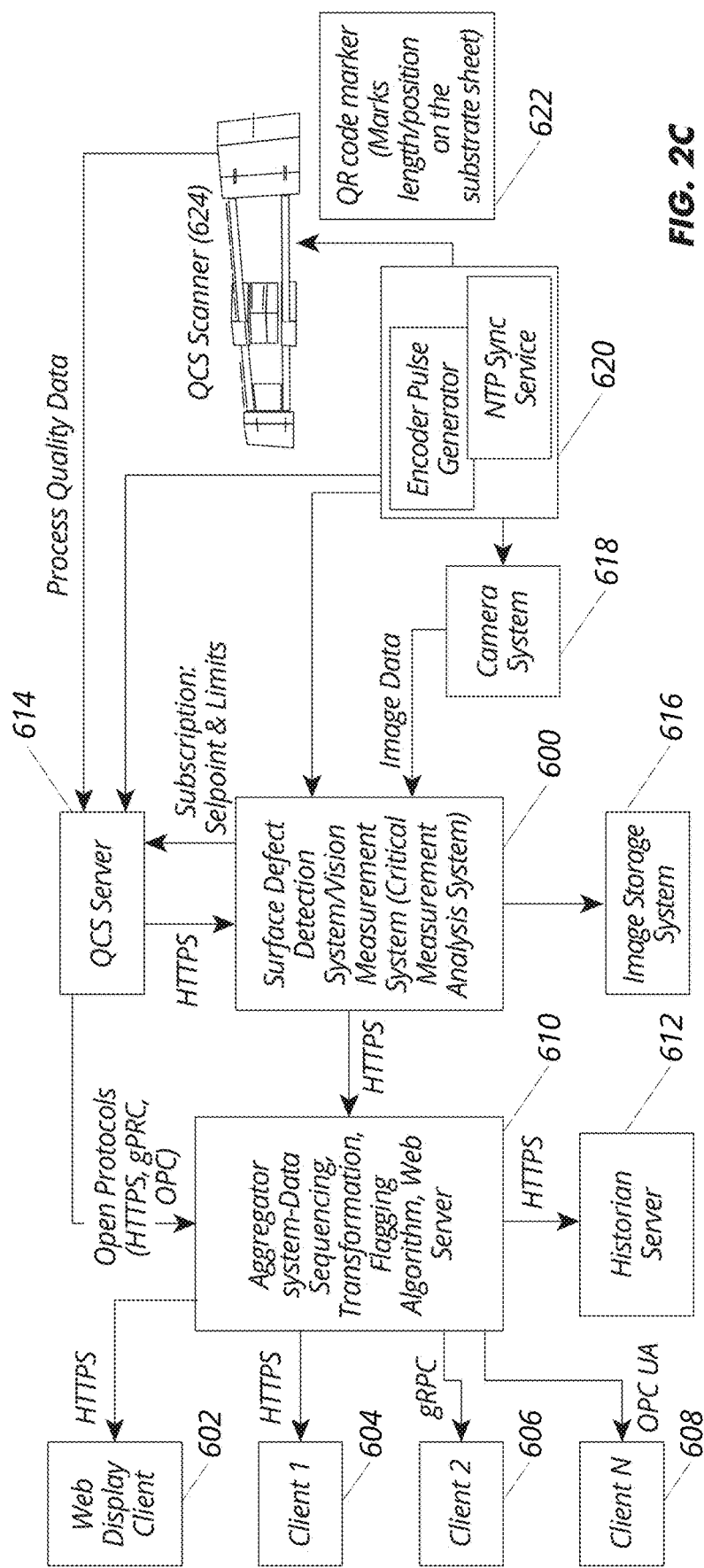
FIG. 2C is a diagram showing the data and logic flow.

FIG. 2C shows a system for generating process quality data from on-line measurements in a continuous electrode manufacturing plant. The system includes various scanners 624 and cameras 618, QCS server 614, surface defect detection system and vision measurement system 600, aggregator node 610, and encode pulse generator and network time protocol synchronization service 620.

A laser etcher/marker is used to mark the edge of an electrode substrate surface at pre-configured regular length intervals with an identifier such that the identifier is present in every frame captured by the camera system. This identifier can be used to identify length of the substrate/material currently being inspected. The identifier can be a bar code, QR code or any other numerical/alphanumeric ID (622) understood by various systems in the solution.

All data generated from the various systems (camera system, surface defects detection system, vision measurement system and QCS server) is tagged with an encoder pulse and time stamp (620) for synchronization in a data aggregator node which combines data from various sources for calculating product quality disposition at the unit level (cathode, anode etc.).

Coated substrate/material images are streamed from a camera system 618 to a surface defect detection system and critical measurement analysis system 600. The surface defect detection system is configured to analyze the image data to detect surface defects such as but not limited to edge void, coating spot, and coating void. In addition, it classifies defects in pre-defined categories and tags data with metadata for further processing. Based on configuration, it saves exception (data with issues only)/full image data in a designated network location (616).

The critical measurement analysis system (vision measurement system) . . . is configured to analyze the image data to detect critical measurement issues such as but not limited to substrate edge to edge coating, and coated and uncoated region width. In addition, it subscribes to setpoints, limits and other metadata from QCS server (614) to effectively run algorithms against setpoints, process limits etc. from the currently selected product recipe. Based on configuration, it saves exception (data with issues only)/full image data in a designated network location.

The aggregator node (610) is configured to sequence the data based on time, encoder pulse and to transforms the data as required. It combines data from surface defects detection system vision measurement system (600) and QCS server (614). It also combines data to detect data patterns to identify scenarios such as cyclic defects, cluster of defects etc. and flag them for operators to easily mark/tag/comment the defective material for downstream operations to take appropriate action. Based on configuration, it can historize exception (data with issues only)/full data with signals to historian server (612). In addition, the aggregator node 610) serves the data in diligently designed user-friendly views for monitoring, analysis and reporting for operator effectiveness and calculates overall quality disposition of the product based on analysis of aggregated and synchronized data. An application programming interface (API) exposes aggregated defect data and/or quality outcome to connected clients (602, 604, 606, 608) using open protocols.

Figure 3:
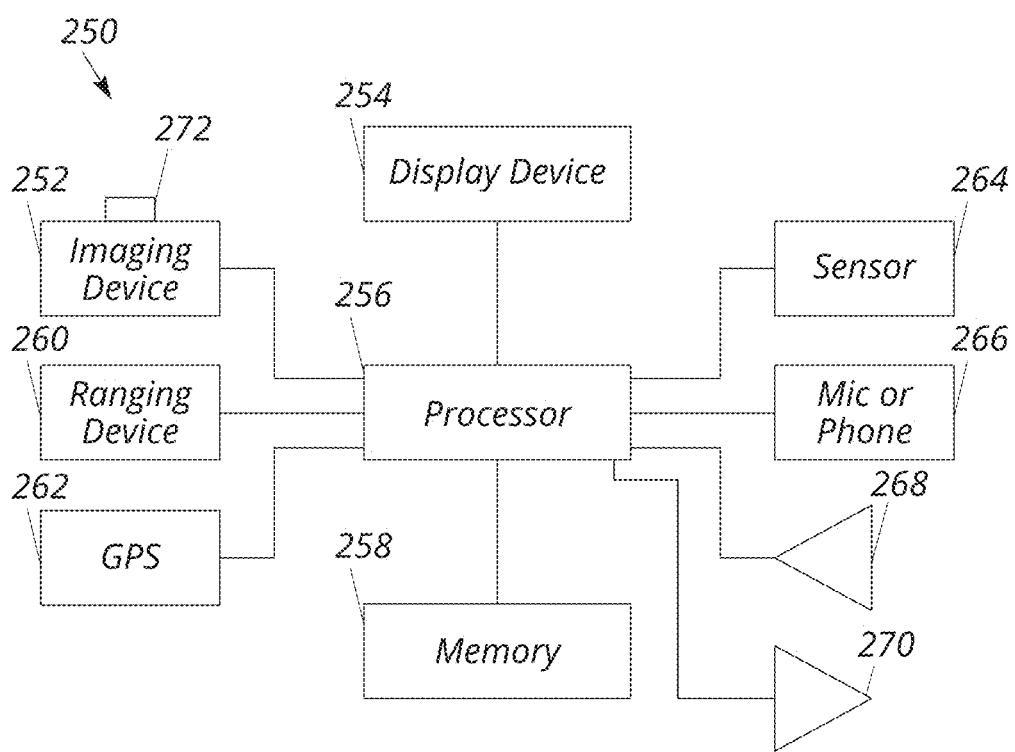
FIG. 3 is a schematic of a monitoring and control apparatus.

FIG. 3 is an embodiment of a display monitoring apparatus 250 that includes an imaging device 252 that is equipped with lens 272, a display device 254, a processor 256, and a memory 258. In the case of monitoring a lithium ion battery production, metal substrate and electrode quality measurement information is stored in the memory 258.

Suitable imaging device 252 includes a digital camera and a video camera that captures video in a frame-by-frame manner. Apparatus 250 may also include a ranging device 260 which is configured to determine a distance from ranging device 260 to a sheet and other surfaces and a global positioning system receiver (GPS) 262 which is configured to determine a position of system 250. The apparatus 250 may include a sensor 264 for recognizing actions by an operator and a microphone 266 for capturing voice commands or inputs from an operator. The processor 256 may be configured for speech recognition and gesture detection so that hand or finger gestures by the operator are identified as user commands to operate apparatus 250.

Finally, apparatus 250 can include a receiver 268 for receiving data from a quality control system of a manufacturing plant and a transmitter 270 for transmitting data to the quality control system. For instance, during battery production, various scanners are employed to measure paper quality. The measurements may be transmitted to apparatus 250 and stored in memory 258. The apparatus 250 may be a portable device that is equipped with cameras, such as tablets and smartphones, that may be modified and programmed.

Illustrative defect maps displaying integrated quality monitoring views of the present invention are shown in the following figures. The defect maps are based on an electrode production process wherein the coated electrode has 250 points or bins across the width; each bin represents a distance of about 5 mm.

Figure 4:
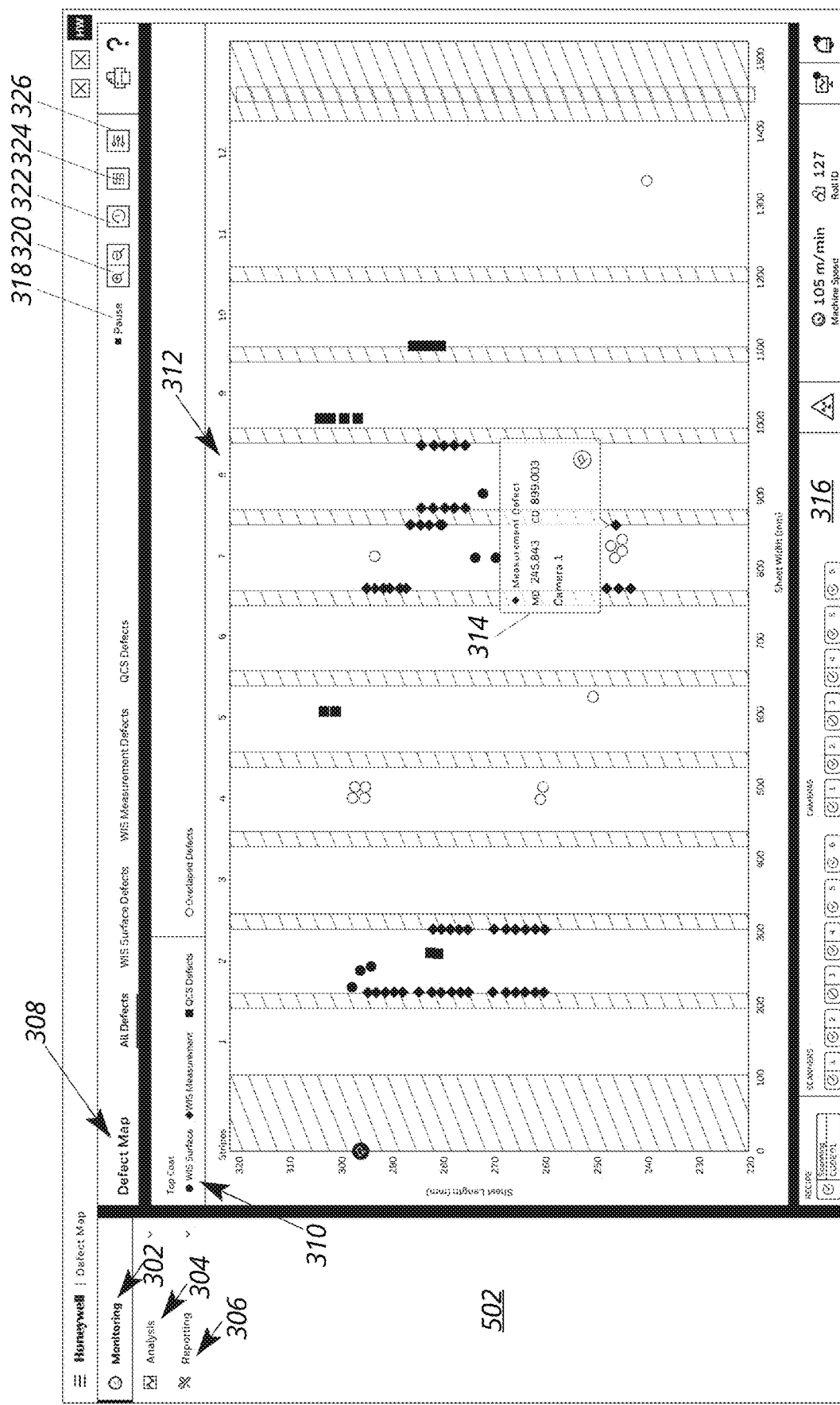
FIG. 4 is a defect map that combines various measurement data and illustrating three main features: defects monitoring, analysis, and diagnostic/reporting of a roll of sheet.

A monitor screen 502 illustrating a defect map 308 of the present invention is shown in FIG. 4. The main navigation of the program has three functions: (1) monitoring 302, which is done in real time, where operators can continuously monitor a sheet coating in progress, (2) analysis 304 where the operator can ascertain insights into the defects, and (3) diagnostic/reporting 306. In this example, the screen shows the monitoring 302 function. The operator can switch between various monitoring systems for the defect map 308, namely: (1) all defects, where the defect map view shows all defect data which are superimposed, (2) web inspection system (WIS) surface defects, (3) WIS measurement defects, and (4) quality control system (QCS) defects. In this example, the All Defects was selected. As shown in region 310 of the screen, the top coat of an electrode being produced was monitored for three properties: (1) WIS Surface, (2) WIS Measurement and (3) QCS Defects. In addition, a fourth symbol denotes overlapping defects. The legend of defect type iconography shows that each defect is represented by a specific symbol or icon. The operator can easily identify the type of defect appearing in the defect map.

The defect map 312 includes 12 columns or strips which represent different portions of the electrode sheet being monitored. The first column on the left represents recently produced coated sheet in which the vertical length corresponding to the machine direction (MD) of the sheet while the width corresponds to the cross direction (CD). The defects are mapped across the columns. In this example, column 2 shows a considerable number of defects of all three types of defects. The position of each defect can be identified by a MD and CD position. As is apparent, much of the defects appear on the edges of the sheet. Column 4 shows a number of overlapping defects.

When the operator hovers the cursor over a specific icon, the program provides information 314 consisting of the MD and CD positions of the defect, the specific type of defect, and the scanner or camera that detected the defect. In this example, region 316 of the monitor screen shows the status of the six cameras and six scanners. In this case, camera 3 and scanner 3 are inactive. The program of the present invention features various actions on the screen: (1) Pause 318 button allows the operator to stop production and take immediate action in case of a major issue, (2) Zoom 320 functionality to enlarge view of an area, (3) view historical details 322 functionality, (4) view more details 324 functionality, and (5) view filters 326 functionality.

Figure 5:
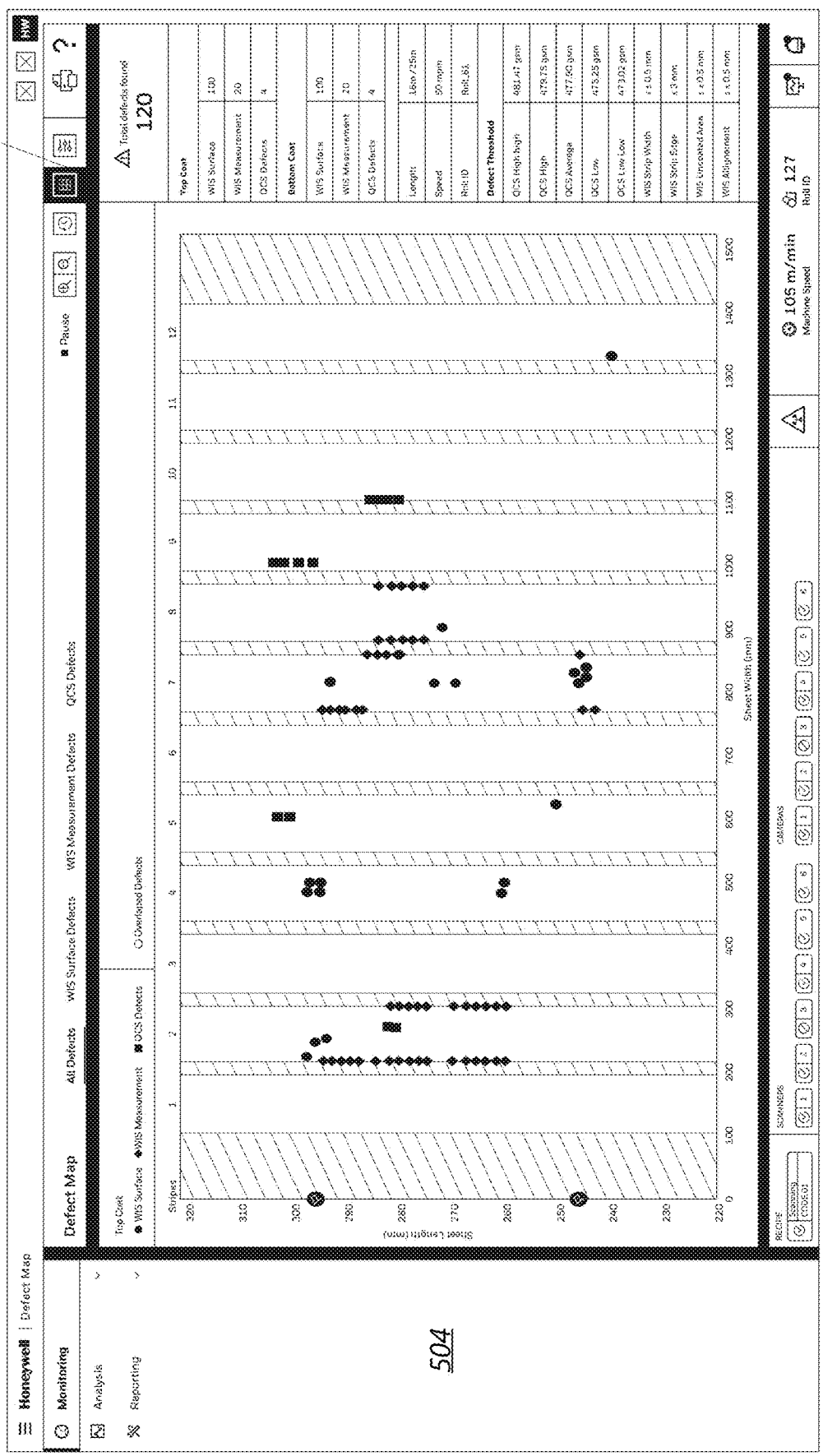
FIG. 5 is a defect map displaying basic details of the roll.

FIG. 5 shows the monitor screen 504 when the view more details 324 option is selected. A side panel opens with the basic details of the roll: (1) total defect count, (2) defect count on the coating side, (3) roll details, and (4) threshold values.

Figure 6:
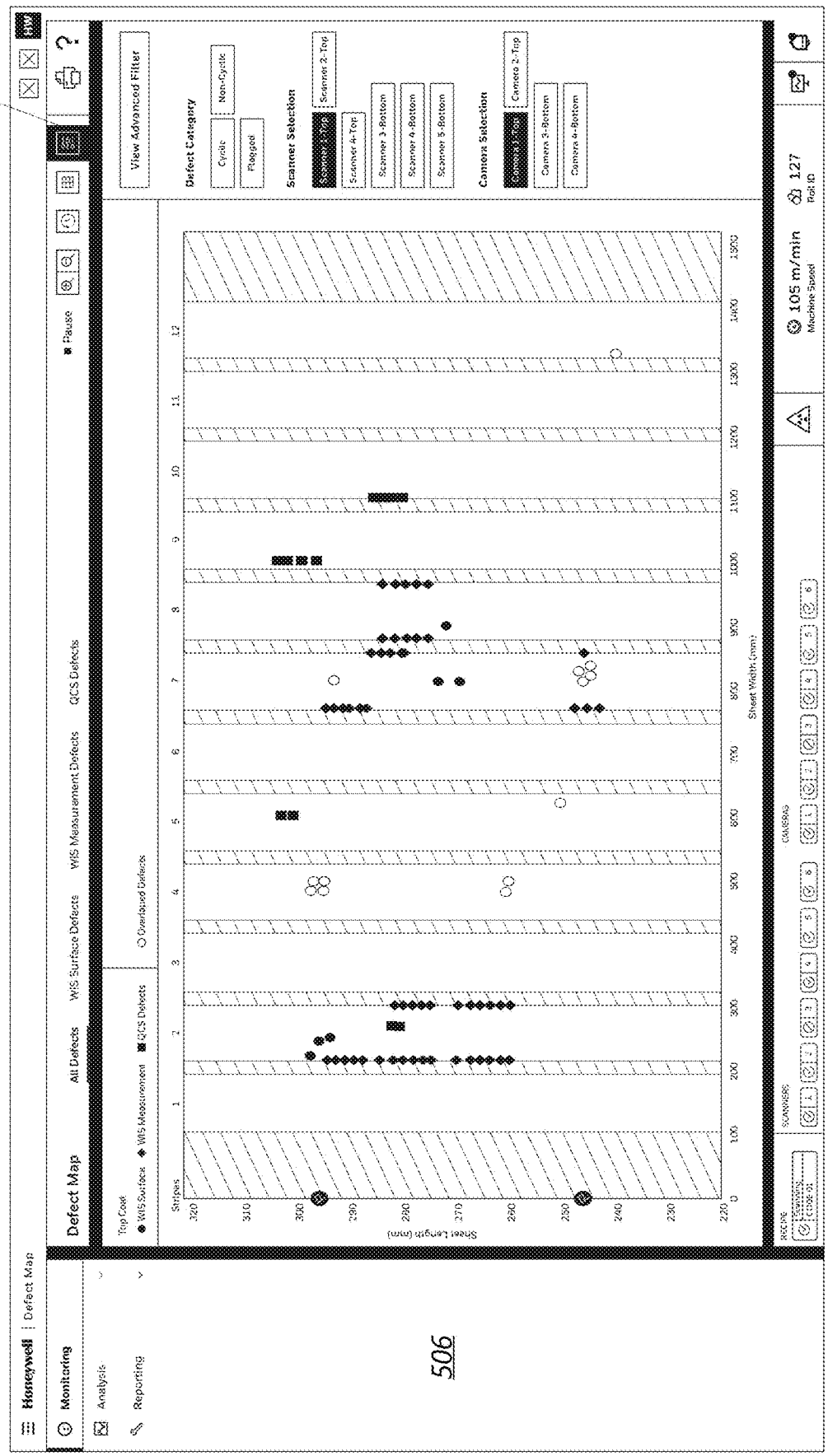
FIG. 6 is a defect map displaying various filter options.
Figure 7:
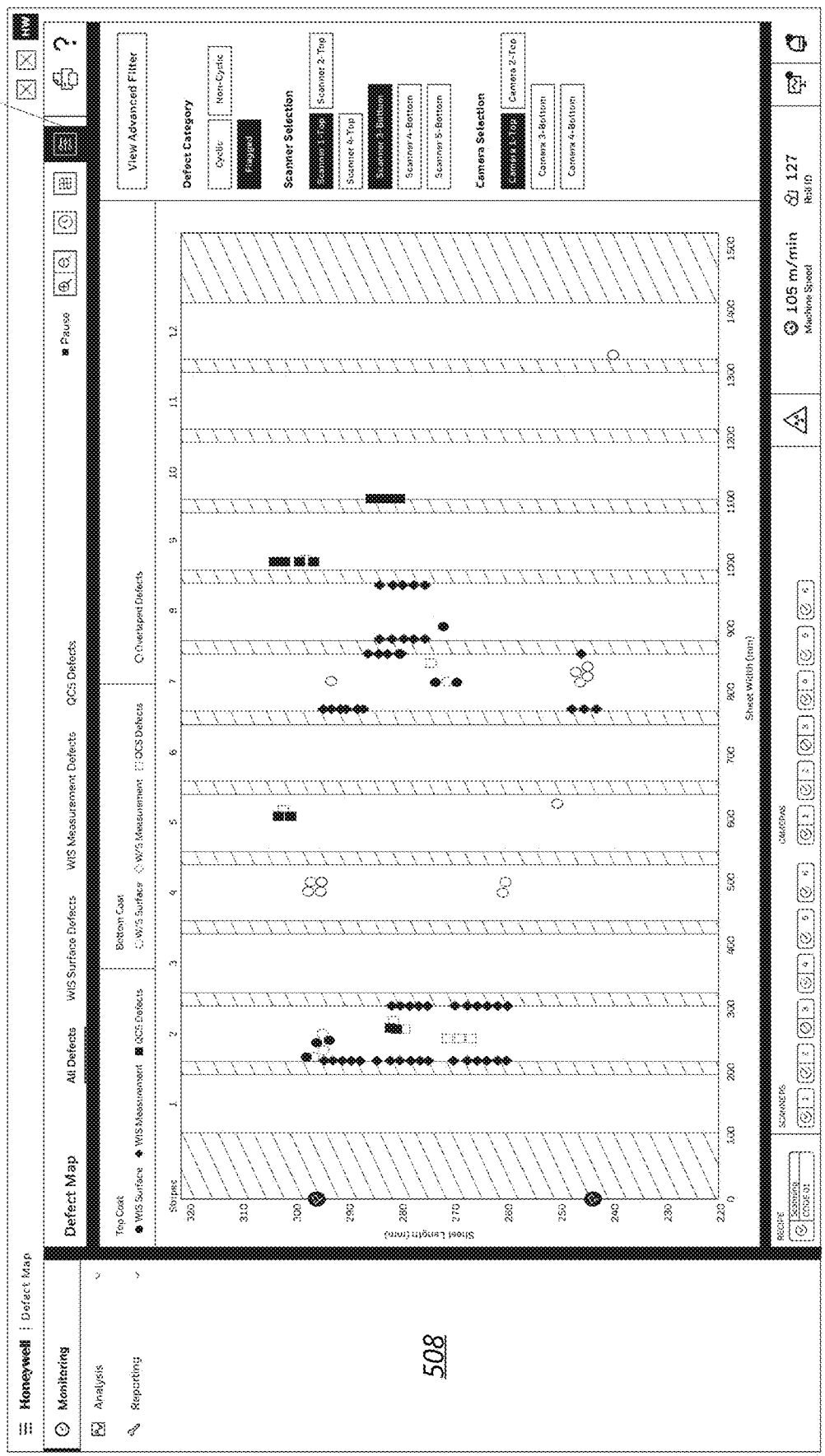
FIG. 7 is a defect map displaying various filter options.

FIG. 6 shows a monitor screen 506 when the filters 326 option is selected. A side panel opens with the basic filters and the panel also has an option to go to advanced filters. The operator can select multiple scanners and/or cameras. This is illustrated in FIG. 7. Under defect category, the operator can filter the defect by the frequency of occurrence, whether cyclic or non-cyclic, and also flag the defect. The operator can either manually flag an area or the system will automatically flag an area based on the defect density. The defect map of FIG. 6 only shows the results where only the top scanners and top cameras are selected in the panel.

FIG. 7 shows the monitor screen 508 when Filters 326 option is selected. The operator has selected multiple views by selecting different angle cameras and scanners including scanners and cameras that face the bottom coat on the electrode. As a result, the bottom coat defects are added as operator has selected scanners and cameras facing the bottom coat. The legend shows the icons associated with the bottom coat. As shown in the defect map now includes bottom coat defects which are superimposed on the same electrode as those of the top coat.

Figure 8:
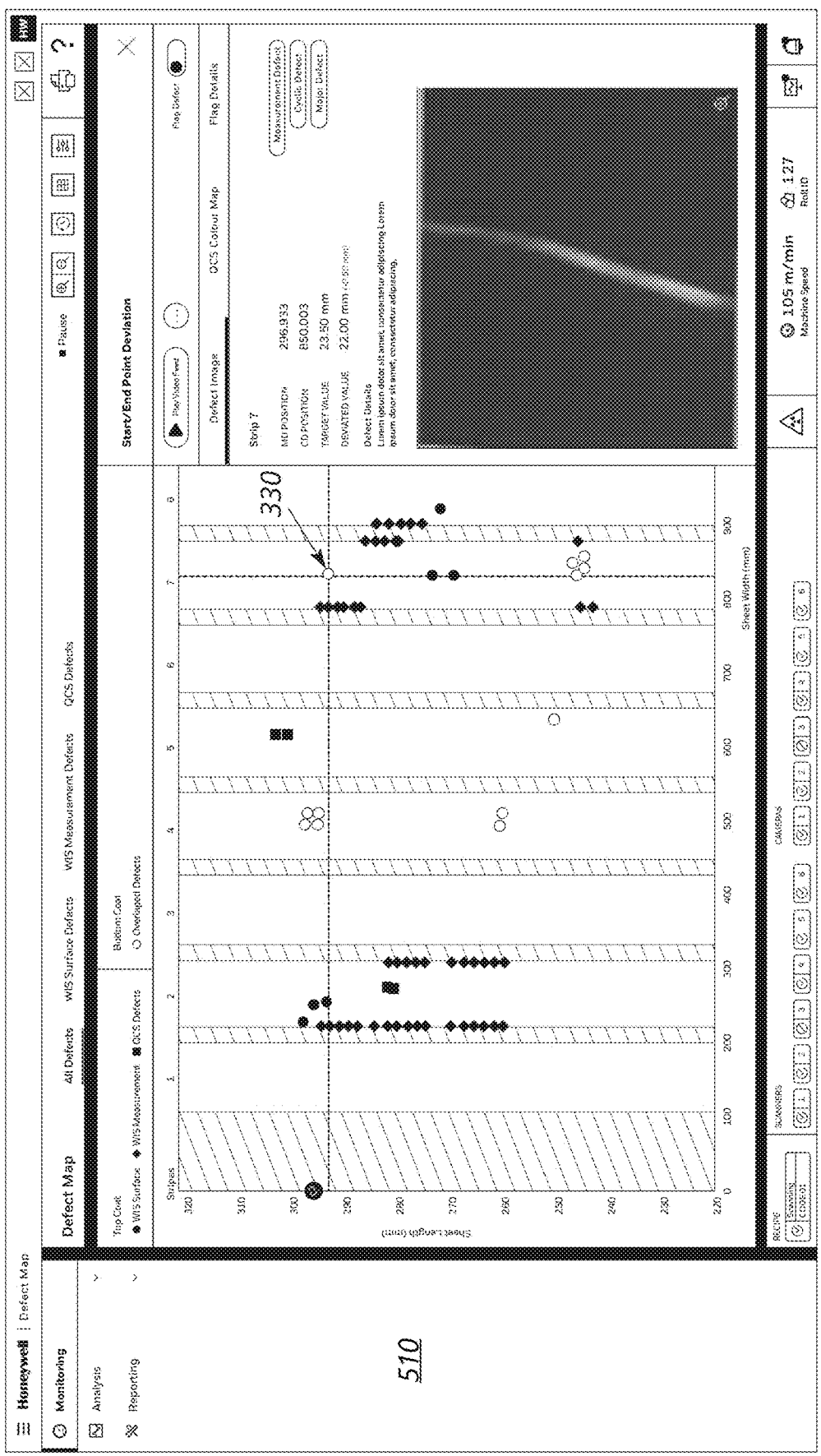
FIG. 8 is a defect map displaying details for a specific individual defect.
Figure 9:
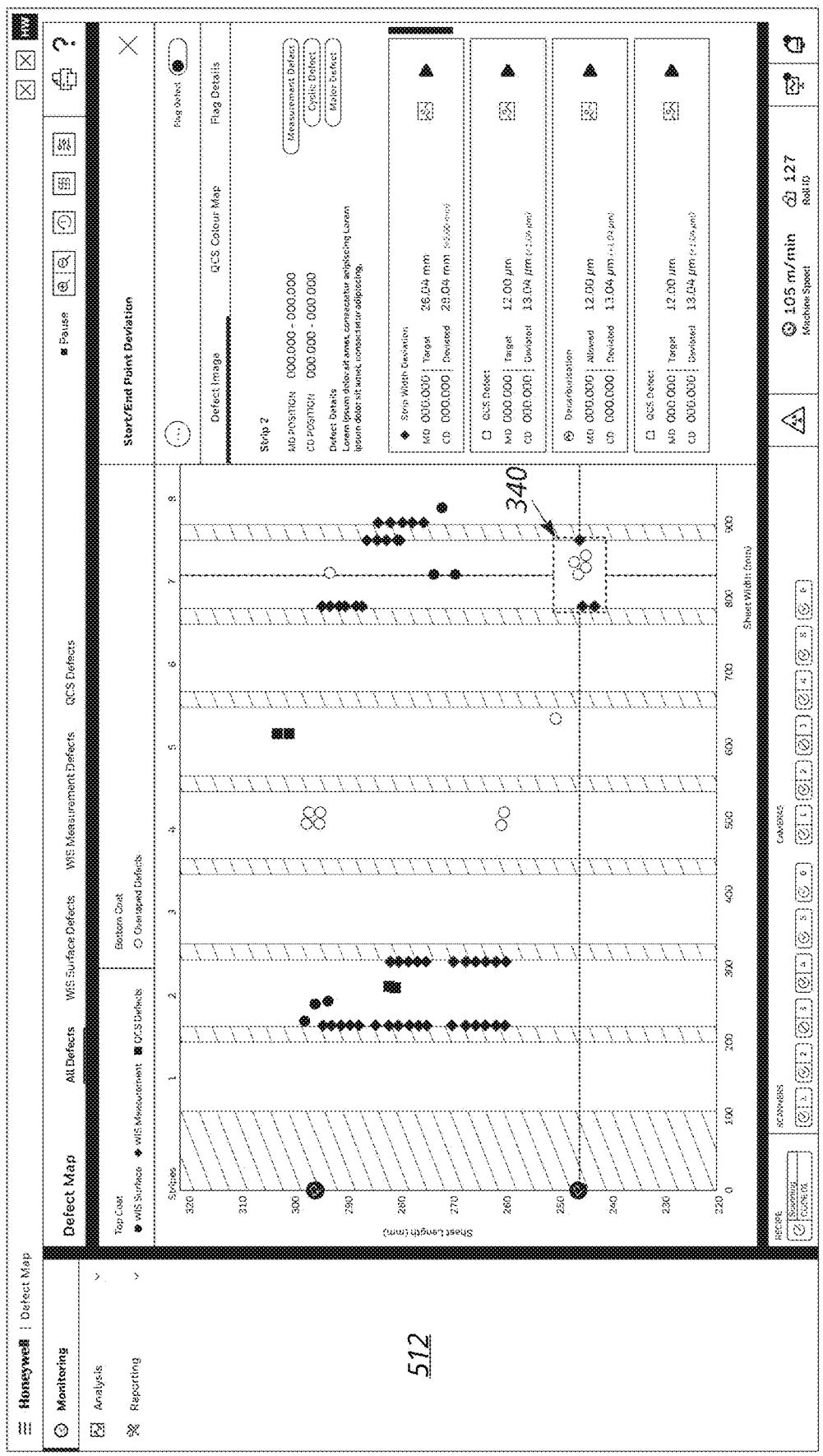
FIG. 9 is a defect map displaying details for defects with a selected area.

FIG. 8 shows the monitor screen 510 when the operator seeks to review details on one particular defect. The program allows the operator to click on a defect or an area of defect to ascertain details about the defect/cluster of defects. In this example, the operator clicked on individual defect 330 which is located in strip number 7. A side panel opens with a first level detail on the defect selected. The panel is divided into three sections: (1) Defect image, (2) Color map and (3) Flag details. As shown in FIG. 9, activating the first tab for the Defect image generates the exact position, size, deviated value and other details of the defect. It also displays an actual image of the defect. The second tab is to access the QCS color map, which is further described in FIG. 11, allows the operator to compare the defect map with a color map to obtain information of how the variations have occurred. The third tab activates the Flag Defects option, which allows the operator to quickly flag individual defects or areas of concern for later review during the analysis phase. With the present invention, automated and manual alerts or flags can be implemented. When critical defects are present on the sheet, the system can be configured to automatically identify the issue and flag the area.

FIG. 9 shows the monitor screen 512 when the operator reviews an area of defects on a strip. In this example, area 340 in strip 7 is selected. Similar details are shown in case of a cluster of defects with minor changes. Instead of individual defect details, the operator gets to see a list of defects with the position and image/video link to the defect. The QCS color map and flagging options are also available. When the Flagged defects feature is selected, an identifier on the y axis appears which allows for easy access these areas. In addition, the operator can go to the filters in the flagged defects mode to see all areas flagged by operator manually or automatically flagged by system.

Figure 10:
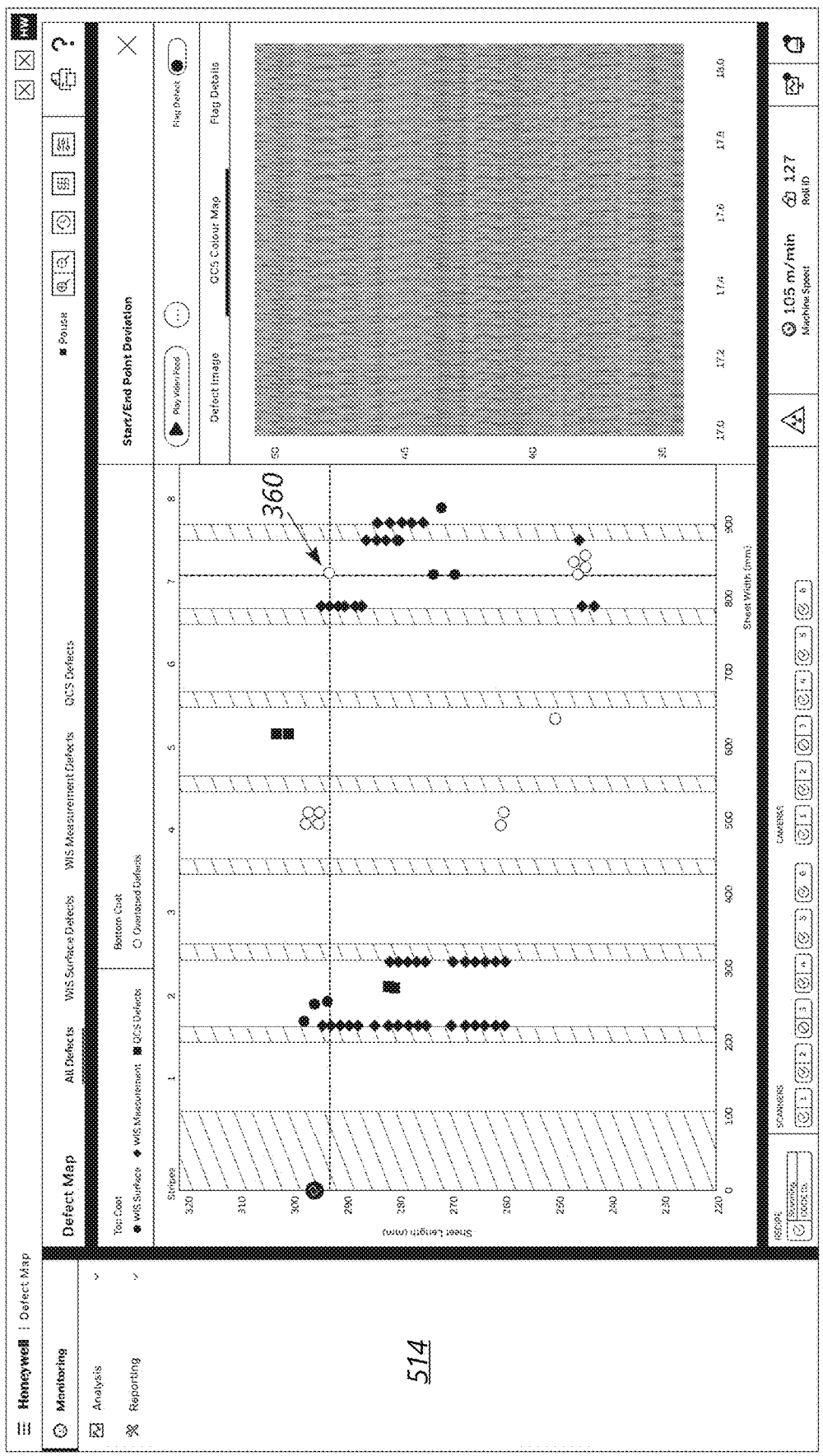
FIG. 10 is a defect map displaying a color map of a selected area.

FIG. 10 shows the monitor screen 514 when the operator seeks to study details on one particular defect in area 360 on strip 7. In this example, the color map option is selected and the operator is able to see a +/−10 scans of a color map on the monitor screen that show the variation trend.

Figure 11:
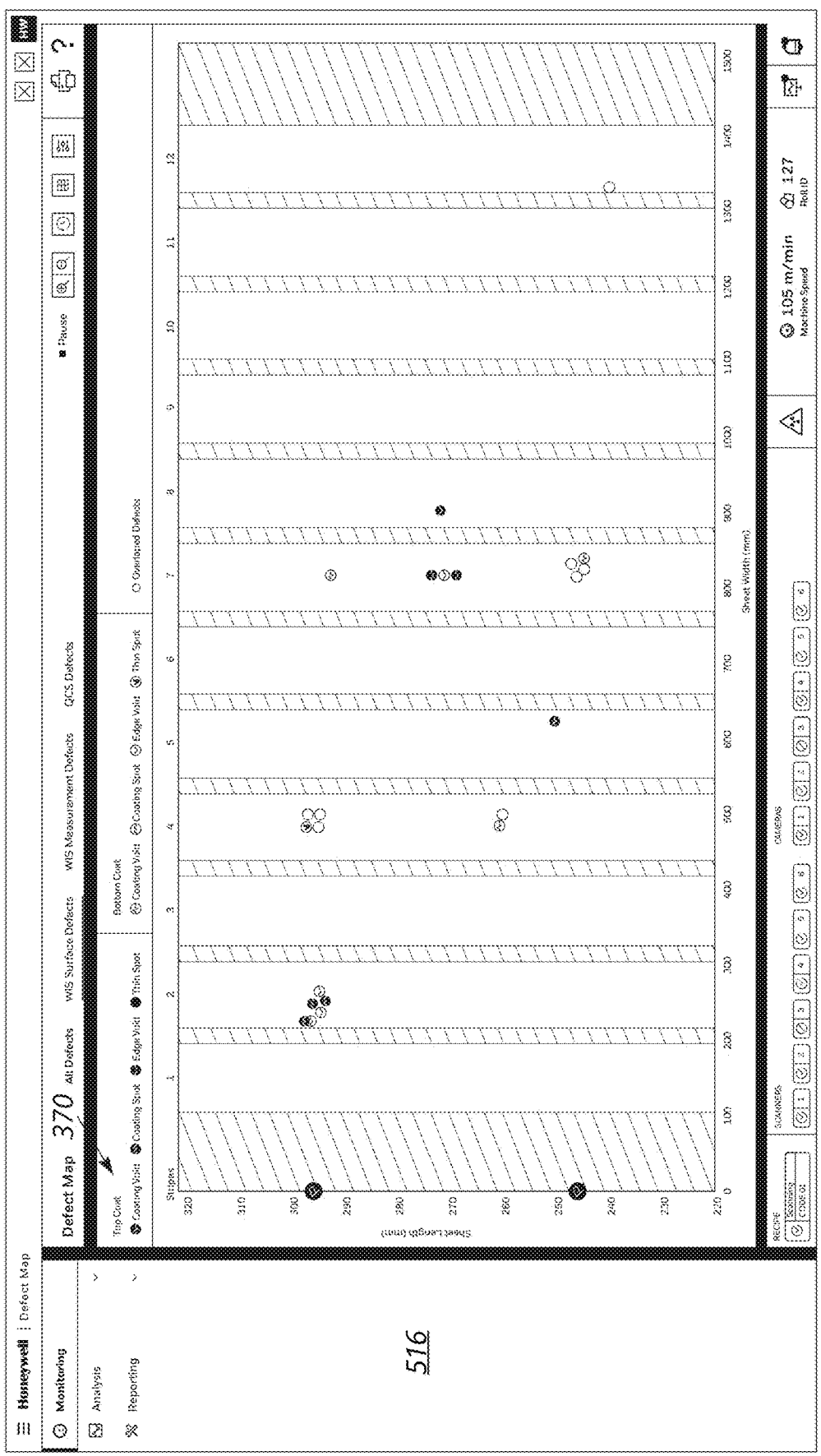
FIG. 11 is a defect map displaying WIS surface defects.

FIG. 11 shows the monitor screen 516 when the operator focuses on monitoring surface defects. The WIS Surface Defects option is selected. The types of surface defects will depend on the sheet material being produced. Surface defects include, for example, holes, craters, bubbling and the like. As shown in legend region 370 of the screen, for electrode production, the top and bottom coats of the electrode the surface defects include: coating voids, coating spots, edge voids and thin spots. Icons for each of these defects for both the top coat and bottom coat are shown. In addition, another icon identifies overlapped defects. The surface defects are shown plotted on the defect map.

Figure 12:
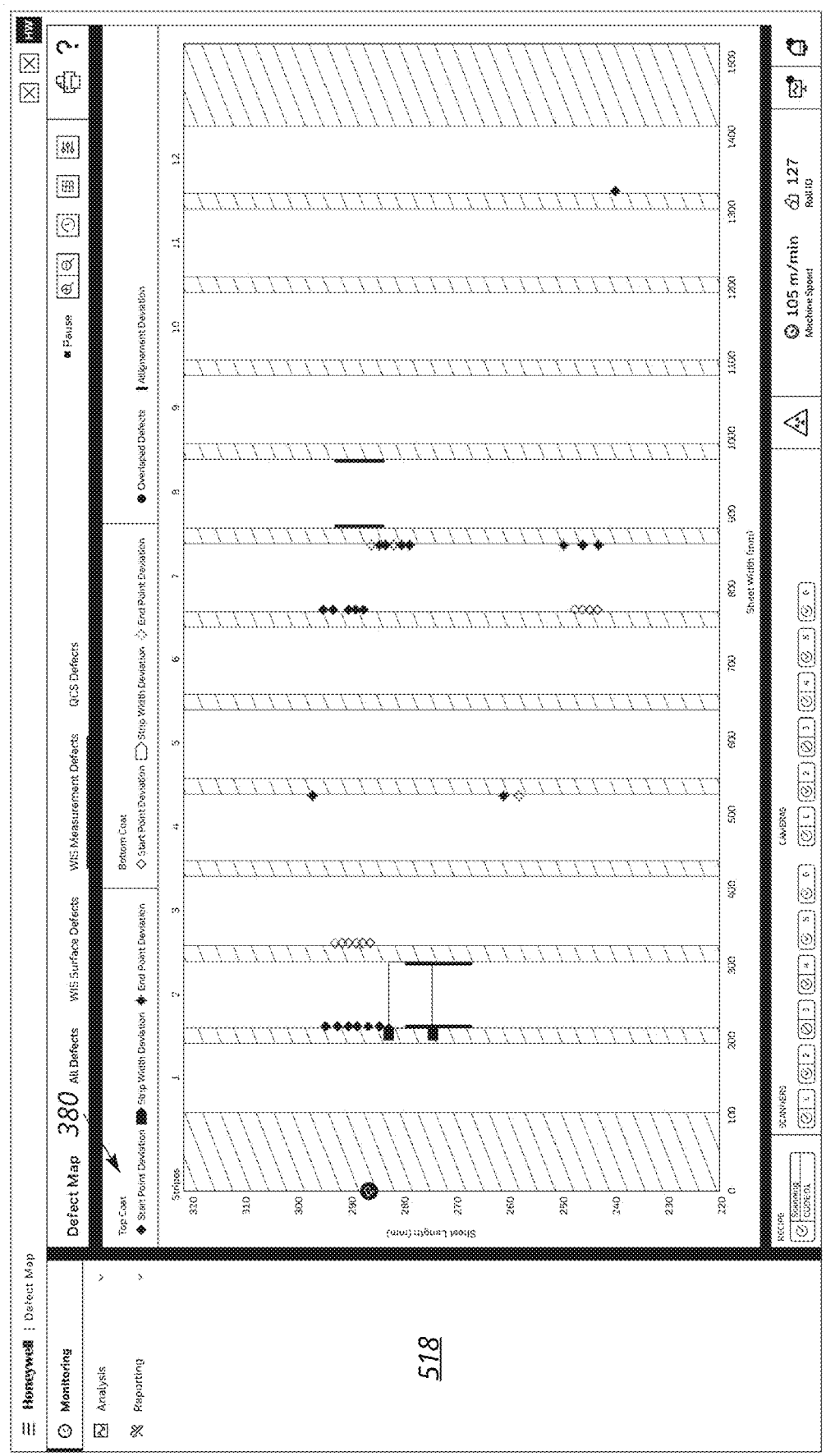
FIG. 12 is a defect map displaying WIS measurement defects.

FIG. 12 shows the monitor screen 518 when the operator wants to focus on monitoring measurement and edge defects. The WIS Measurement Defects option is selected. The program provides detailed view for measurement defects or edge defects that measure the variations on the edges of the sheet. As shown in legend region 380 of the screen, for electrode production, the top and bottom coats of the electrode the measurement and edge defects include: start point deviation, coating spots, edge voids and thin spots. Icons for each of these defects for both the top coat and bottom coat are shown. In addition, another icon identifies overlapped defects. The surface defects are shown plotted on the defect map.

Figure 13:
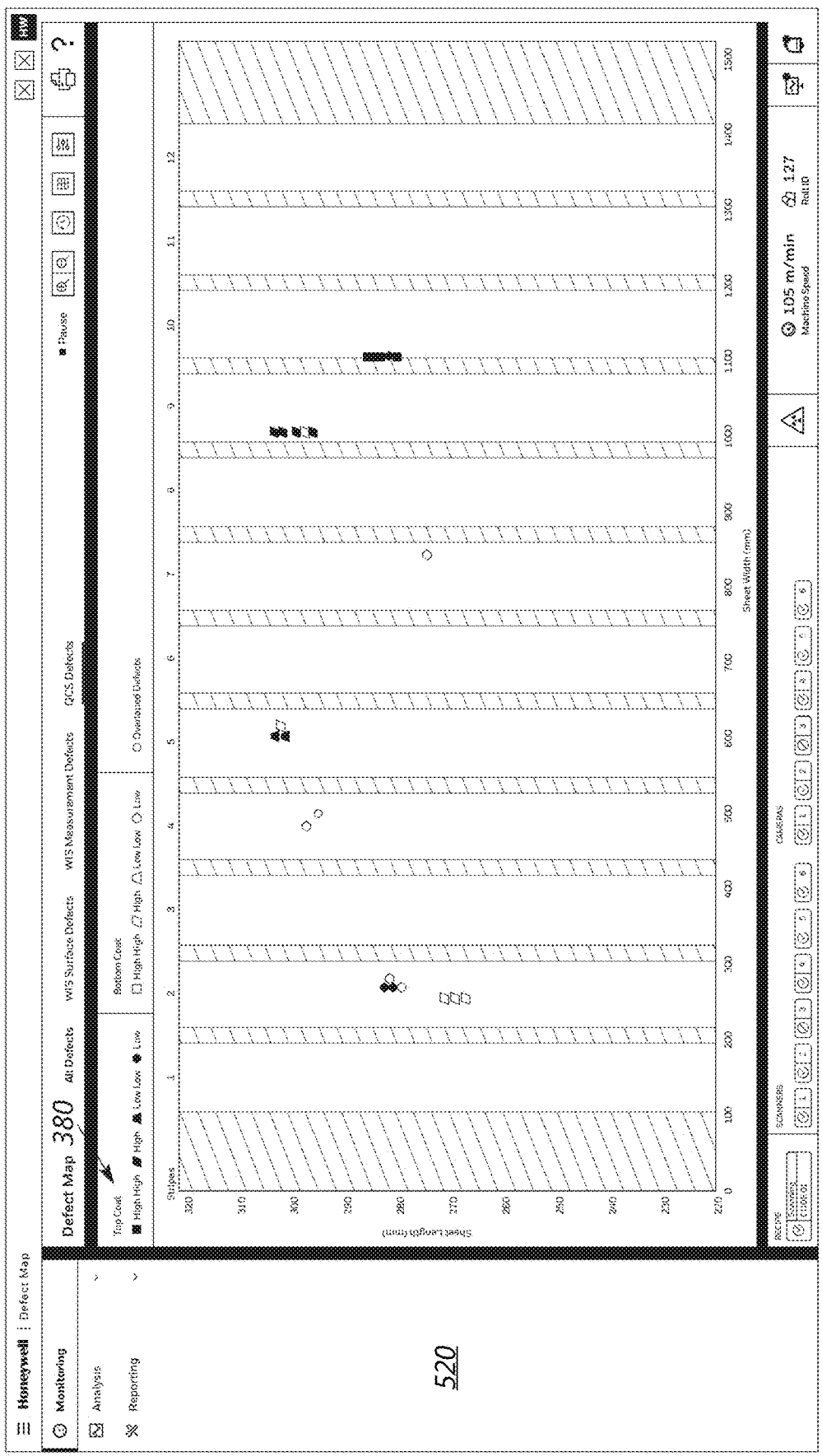
FIG. 13 is a defect map displaying QCS defects.

FIG. 13 shows the monitor screen 520 when the operator focuses on QCS defects and the QCS Defects option is selected. The types of QCS defects will depend on the sheet material being produced. Surface defects include, for example, deviations in basis weight and thickness. As shown in legend region 390 of the screen, for electrode production, the top and bottom coats of the electrode the QCS defects monitored include deviations of the basis weight which are classified as: high-high, high, low-low and low. Icons for each of these defects for both the top coat and bottom coat are shown. In addition, another icon identifies overlapped defects. The basis weight defects are shown plotted on the defect map.

Figure 14:
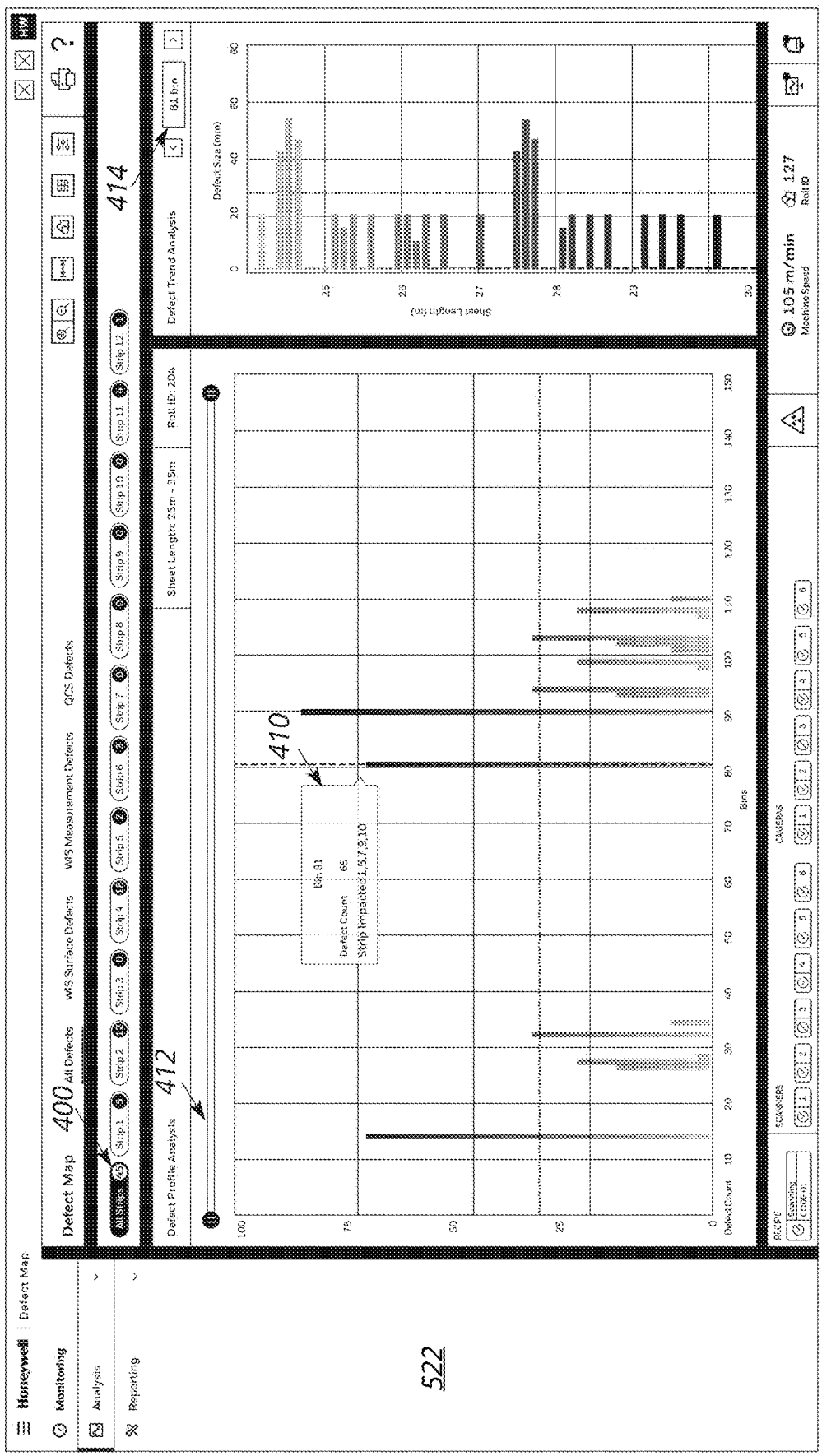
FIG. 14 is a defect map displaying data analysis.

FIG. 14 shows the monitor screen 522 when the program is operating in the analysis function covering All Defects 400. The operator can view the historical data of the sheet. The analysis screen features the same navigations options discussed previously for users to select items easily. In addition, there is a strip-wise filter which gives a high-level view of the health of each strip. As shown in the region 400, the strip-wise filter shows each strip number 1-12 and the defect count in each strip. In this example, there is indicated a total of 45 defect counts in all 12 strips. There is a Zoom 412 functionality for enlarging the graph. The bar graph shows the number of defects in each bin. An operator can use selection list 414 to choose a bin for additional details. In this example, the operator selected bin 81; there is indicated a total of 65 defect counts in bin 81 as shown in area 410. The detailed bin view on the right shows the defect size distribution across the length of the electrode for bin 81. The size of the defect is on the x axis. It should be noted that the total defect counts in strips 1-12 is noted as being 45 whereas the total for all the bins is much higher. The reason is that the historical data covers not only strips 1-12 but other old bins as well.

Figure 15:
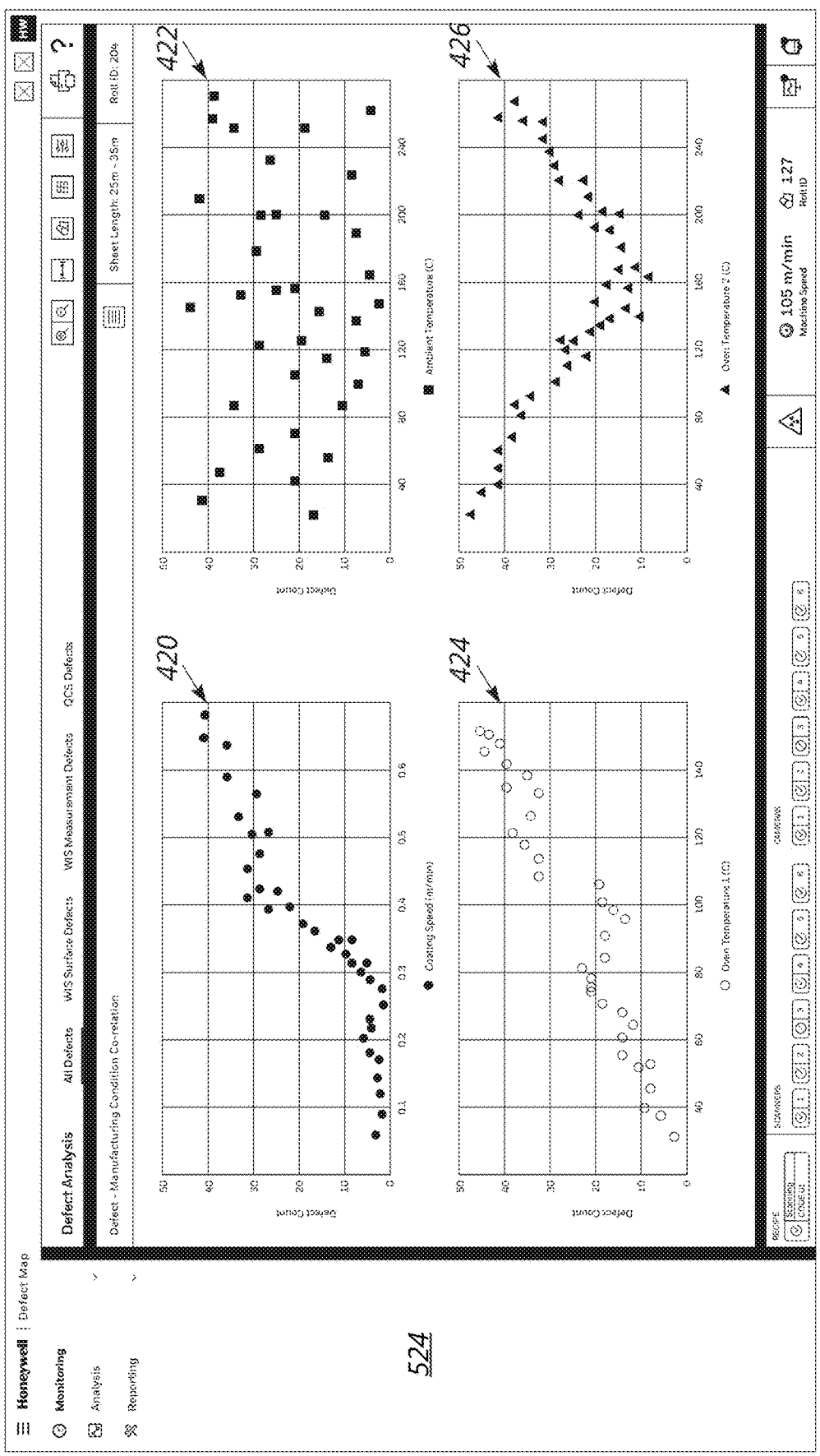
FIG. 15 is a defect map displaying data analysis.

FIG. 15 shows the monitor screen 524 when the program is operating in the analysis function covering All Defects. The operator has selected to receive information on the effects that certain variables have on the number of defects. Graph 420 shows the number of defects vs. coating speed. Graph 422 shows the number of defects vs. ambient temperature. Graph 424 shows the number of defects vs. oven temperature 1 and graph 426 shows the number of defects vs. oven temperature 2.

Figure 16:
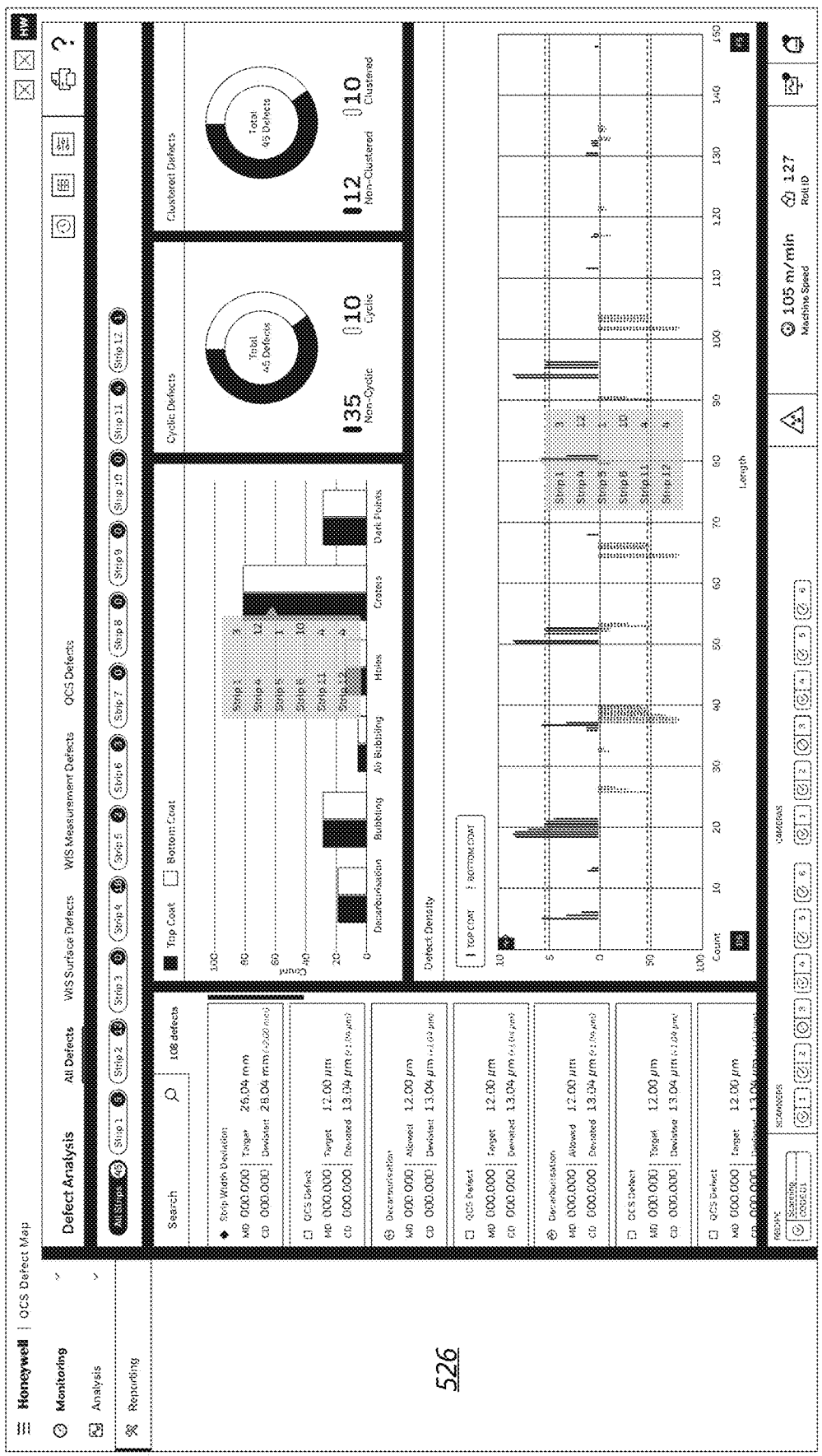
FIG. 16 is a defect map displaying reporting.
Figure 17:
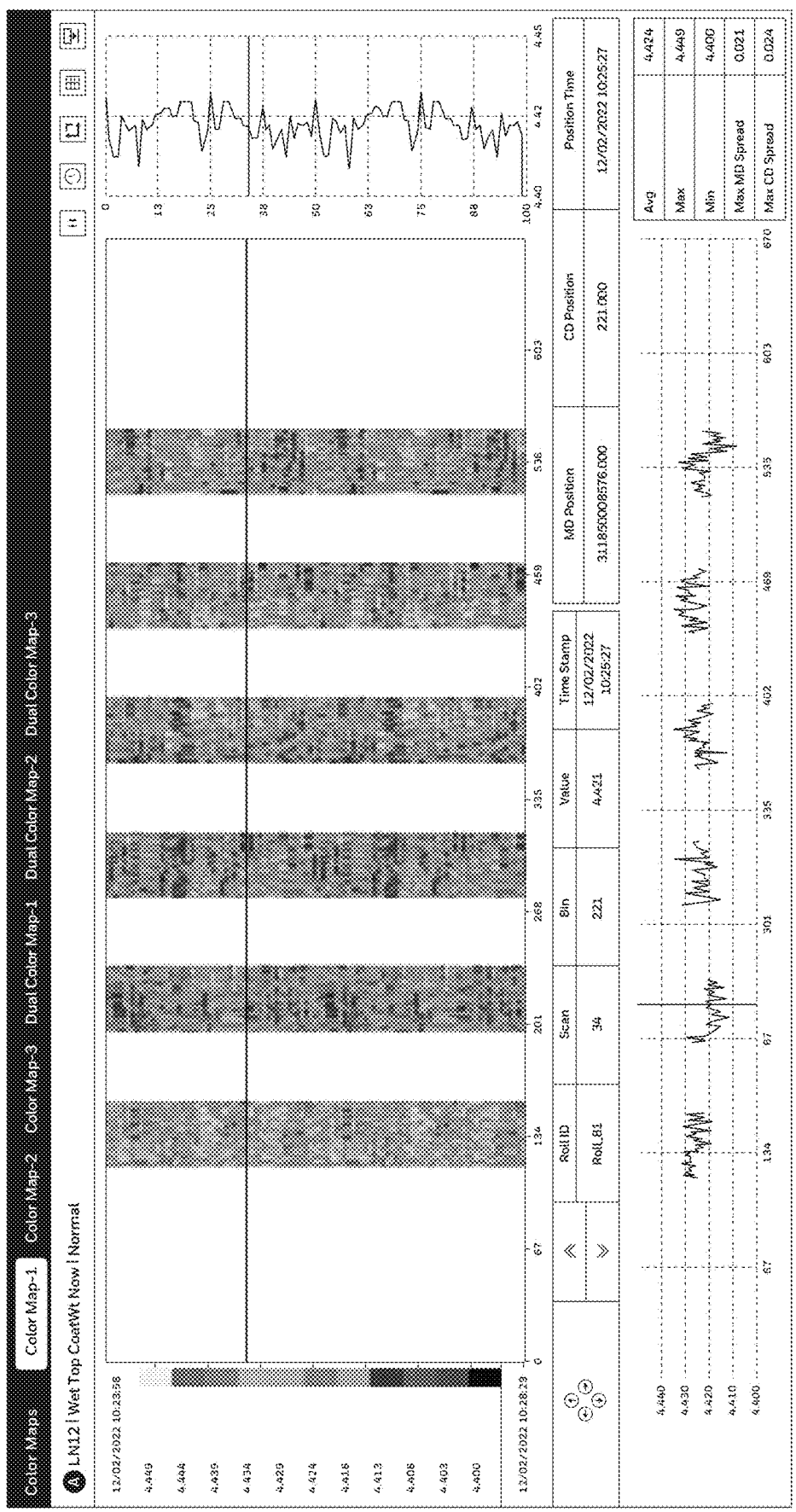
FIG. 17 is a prior art map displaying variations in sheet properties.
Figure 18:
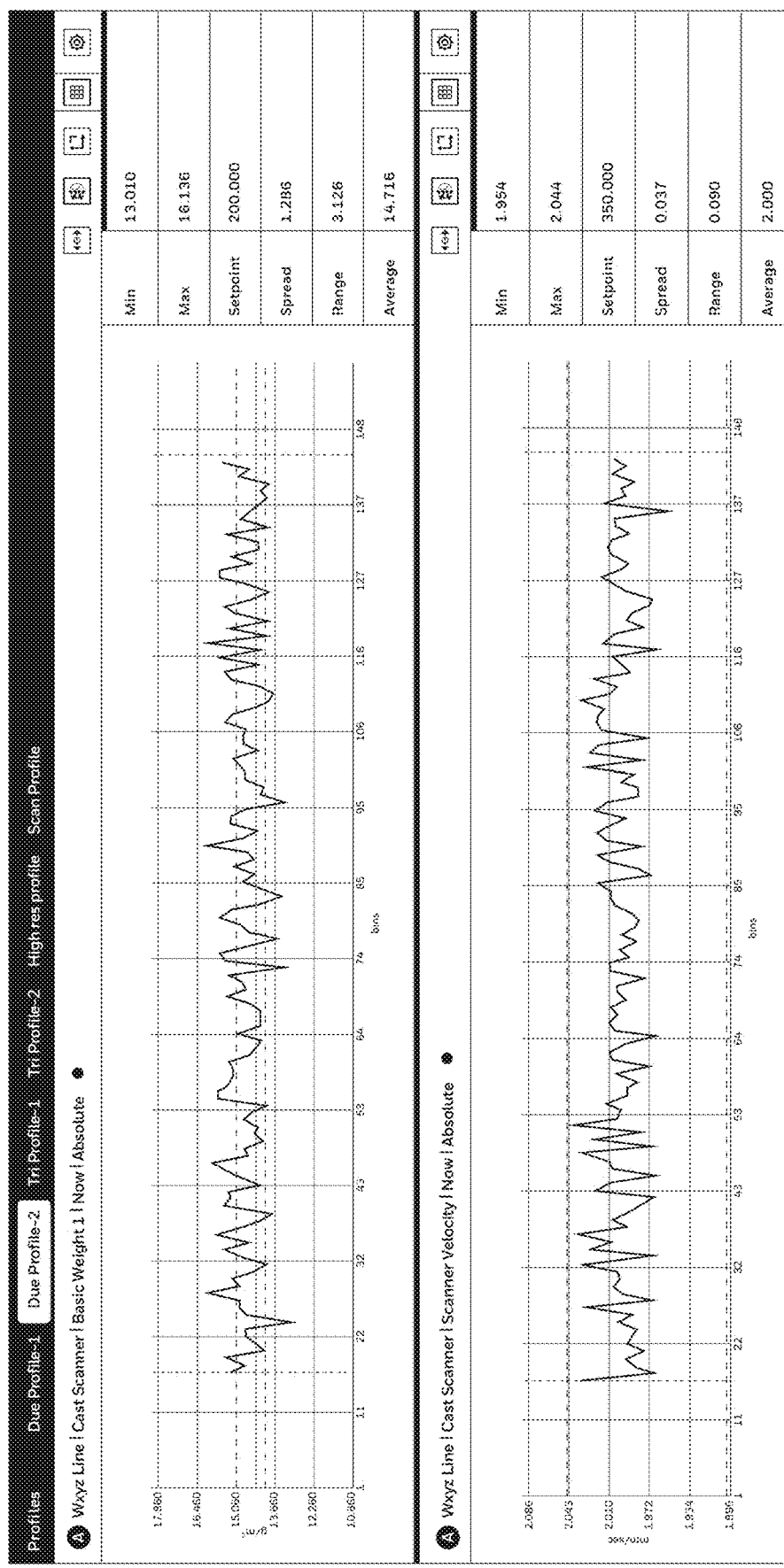
FIG. 18 is a prior art profile view displaying variations in sheet properties and defects.

FIG. 16 shows the monitor screen 526 when the program is operating in the reporting function covering All Defects. The breakdown of count vs. 6 different types of defects in strips 1-12 is shown for the top coat vs. the bottom coat. The breakdown of cyclic defects vs. non-cyclic defects is shown. The breakdown of clustered defects vs. non-clustered defects is shown. The defect density of count vs. length in strips 1-12 is shown for the top coat vs. the bottom coat.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of inferring quality of a sheet roll, the method comprising:
monitoring surface defects of the sheet roll using at least one imaging device configured to capture surface images of the sheet roll;
monitoring measurement defects of the sheet roll using a vision measurement system comprising at least one scanner configured to measure at least a basis weight and a thickness of the sheet roll; and
monitoring quality and defect data of the sheet roll using a quality control system comprising a processor configured to analyze data received from the at least one imaging device and the at least one scanner;
applying, by a marker device, fiducial markers on the sheet roll at predefined intervals along a machine direction, wherein the fiducial markers synchronize a defect measurement using data from the at least one imaging device, the vision measurement system and the quality control system; and
generating, by the processor, a defect map that visually represents and correlates a defect data obtained from the at least one imaging device, at least one scanner, and the quality control system.

2. The method of claim 1, wherein the monitoring of surface defects, measurement defects, and quality and defect data is continuous.

3. The method of claim 1, wherein the monitoring of surface defects, measurement defects, and quality and defect data is real-time.

4. The method of claim 1 further comprising deriving an analysis pattern.

5. The method of claim 1 further comprising reporting the data simultaneously.

6. The method of claim 1 further comprising viewing the data in real-time.

7. The method of claim 1 further comprising taking corrective action.

* * * * *